United States Patent
Gupta et al.

(10) Patent No.: US 9,713,180 B1
(45) Date of Patent: Jul. 18, 2017

(54) RELAY CENTRIC MOBILITY MANAGEMENT IN A MESH NETWORK

(71) Applicant: QUALCOMM INCORPORATED, San Diego, CA (US)

(72) Inventors: Piyush Gupta, Bridgewater, NJ (US); Junyi Li, Chester, NJ (US); Saurabha Tavildar, Jersey City, NJ (US)

(*) Notice: Subject to any disclaimer, the term of this patent is extended or adjusted under 35 U.S.C. 154(b) by 0 days.

(21) Appl. No.: 15/206,082

(22) Filed: Jul. 8, 2016

Related U.S. Application Data

(60) Provisional application No. 62/308,552, filed on Mar. 15, 2016.

(51) Int. Cl.
*H04H 20/38* (2008.01)
*H04B 3/36* (2006.01)
(Continued)

(52) U.S. Cl.
CPC ............ *H04W 76/021* (2013.01); *H04B 3/36* (2013.01); *H04H 20/38* (2013.01); *H04L 45/026* (2013.01);
(Continued)

(58) Field of Classification Search
CPC ............... H04W 76/021; H04W 4/005; H04W 52/0209; H04W 72/0413; H04W 72/042;
(Continued)

(56) References Cited

U.S. PATENT DOCUMENTS

| 9,178,772 | B2 | 11/2015 | Dasgupta et al. |
| 2004/0230638 | A1 | 11/2004 | Balachandran et al. |

(Continued)

FOREIGN PATENT DOCUMENTS

| EP | 2833694 A2 | 2/2015 |
| WO | WO-2007008857 A2 | 1/2007 |

(Continued)

OTHER PUBLICATIONS

Devasenapathy S., et al., "Between Neighbors: Neighbor Discovery Analysis in EH-IoTs," 10th International Conference on Autonomic Computing (ICAC '13), 2013, pp. 193-200.

(Continued)

*Primary Examiner* — Awet Haile
(74) *Attorney, Agent, or Firm* — Qualcomm IP Dept.; James Hunt Yancey, Jr.

(57) ABSTRACT

Systems and methods are disclosed for efficient signaling between devices. A relay device initiates association with discovery broadcast signals to leaf devices. Each leaf responds with association request signals. After association, the relay periodically sends stay alive signals to the leaf, and the leaf periodically sends link confirmation signals to the relay. If either device fails to send its signal, link breakage is assumed. The leaf device reverts to uplink communication with a base station while searching for another relay. In another embodiment, the leaf foregoes association with a relay, instead forming a device to device (D2D) connection with a relay. A D2D connection is used when the leaf does not expect a link to a relay to be stable enough to justify the association overhead, or when downlink traffic is arriving more frequently than an associated relay is awake. Other aspects, embodiments, and features are also claimed and described.

30 Claims, 10 Drawing Sheets

(51) Int. Cl.
*H04W 76/02* (2009.01)
*H04L 12/751* (2013.01)
*H04W 72/04* (2009.01)
*H04W 72/12* (2009.01)
*H04W 4/00* (2009.01)
*H04W 40/00* (2009.01)
*H04W 52/02* (2009.01)
*H04L 12/933* (2013.01)
*H04W 88/06* (2009.01)

(52) U.S. Cl.
CPC ......... *H04L 49/1584* (2013.01); *H04W 4/005* (2013.01); *H04W 40/005* (2013.01); *H04W 52/0209* (2013.01); *H04W 72/042* (2013.01); *H04W 72/0413* (2013.01); *H04W 72/1215* (2013.01); *H04W 88/06* (2013.01)

(58) Field of Classification Search
CPC ........ H04B 3/36; H04H 20/38; H04L 45/026; H04L 49/1584
See application file for complete search history.

(56) References Cited

U.S. PATENT DOCUMENTS

| | | |
|---|---|---|
| 2006/0215581 A1 | 9/2006 | Castagnoli et al. |
| 2009/0092049 A1* | 4/2009 | Hargrave ............... H04L 12/66 370/235 |
| 2009/0322488 A1 | 12/2009 | Kanagala et al. |
| 2013/0322388 A1 | 12/2013 | Ahn et al. |
| 2015/0078198 A1 | 3/2015 | Estevez et al. |
| 2015/0113154 A1 | 4/2015 | Nguyen et al. |
| 2015/0138977 A1 | 5/2015 | Dacosta |
| 2015/0172387 A1 | 6/2015 | Ge et al. |
| 2015/0181620 A1* | 6/2015 | Seok ..................... H04W 74/08 370/311 |
| 2015/0312953 A1 | 10/2015 | Wang et al. |
| 2016/0029359 A1 | 1/2016 | Agiwal et al. |
| 2016/0050635 A1 | 2/2016 | Choi et al. |
| 2016/0066137 A1 | 3/2016 | Kulkarni et al. |
| 2016/0150373 A1 | 5/2016 | Kim et al. |
| 2016/0174148 A1* | 6/2016 | Seed ................ H04W 52/0216 370/311 |
| 2016/0249390 A1* | 8/2016 | Hans ..................... H04W 68/02 |
| 2016/0295565 A1 | 10/2016 | Kim et al. |

FOREIGN PATENT DOCUMENTS

| | | |
|---|---|---|
| WO | WO-2015002508 A2 | 1/2015 |
| WO | WO-2015006636 A1 | 1/2015 |
| WO | WO-2015191995 A1 | 12/2015 |

OTHER PUBLICATIONS

Taneja M, "A Framework for Power Saving in IoT Networks", IEEE, 2014 International Conference on Advances in Computing, Communications and Informatics (ICACCI), 2014, pp. 369-375.
Non-Final Office Action issued in U.S. Appl. No. 15/206,031 on Jul. 8, 2016.
International Search Report issued in PCT/US2017/017378 on May 19, 2017.
Written Opinion issued in PCT/US2017/017378 on May 19, 2017.

* cited by examiner

RELAY CENTRIC MOBILITY MANAGEMENT IN A MESH NETWORK

CROSS-REFERENCE TO RELATED APPLICATIONS

The present application claims the benefit of U.S. Provisional Patent Application No. 62/308,552 filed Mar. 15, 2016, and entitled "Relay Centric Mobility Management in a Mesh Network," the disclosure of which is incorporated by reference herein in its entirety.

TECHNICAL FIELD

This application relates to wireless communications systems, and in particular to managing mobility of low power Internet of Things (or Internet of Everything) devices using a mesh network. Embodiments and enable efficient network system deployment scenarios as well as efficient use of limited power resources.

INTRODUCTION

Wireless communication networks function to allow general purpose devices such as cellular phones, personal digital assistants (PDAs), and laptops to transmit and receive information reliably and on demand. In addition, more and more devices with proprietary functions are being designed with internet connectivity in mind. These devices are known as internet of everything (IOE) devices. They can include, for example, household appliances, location beacons, or status monitors for remotely located facilities. Some IOE devices are designed to function for very long periods of time—weeks, months, or even years—on a battery, without access to another power source. In these applications there is a need for minimizing the power consumed by radio communications with the IOE device. Systems typically employ sleep cycles during which an IOE device's transceivers are powered down to reduce power consumption. The IOE device has an internally stored schedule that instructs the device to wake up its transceivers in time to listen for potential data transmissions.

In some use cases, an IOE device may not have a consistent communications channel open to a base station, and a mesh network may be employed to allow other devices (whether IOE or other) to act as a relay to the base station. For example, a utility meter in a basement may not be able to reliably reach a base station, and instead use another IOE device above the basement as a relay to communicate with the base station. In other cases, a mobile IOE device may move out of range of a relay IOE device, or vice versa, requiring the mobile IOE device to find a new relay IOE device to maintain communication with the base station. This presents a unique challenge with respect to mobility management and downlink paging for IOE devices that employ sleep cycles to save power, as the IOE devices coordinate during their relatively short awake cycles.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the invention, a method of wireless communication includes associating, by the first wireless communications device, with a relay wireless communications device during a first awake period common to the first wireless communications device and the relay wireless communications device. The method further includes monitoring, by the first wireless communications device, for a stay alive signal from the relay wireless communications device during a second awake period that occurs at a first periodic rate regardless of whether there is traffic to receive. The method further includes sending, by the first wireless communications device, a link confirmation signal to the relay wireless communications device during a third awake period that occurs at a second periodic rate regardless of whether there is traffic to transmit, wherein the first wireless communications device is asleep at a time that overlaps a sleep time of the relay wireless communications device.

In an additional aspect of the invention, a method of wireless communication includes sending, from a first wireless communications device to a second wireless communications device, a discovery broadcast signal during a first awake period that occurs at a first periodic rate. The method further includes receiving, from the second wireless communications device, an association request signal during a second awake period. The method further includes sending, from the first wireless communications device to the second wireless communications device, a stay alive signal during a third awake period that occurs at a second periodic rate. The method further includes monitoring, by the first wireless communications device, for a link confirmation signal from the second wireless communications device during a fourth awake period that occurs at a third periodic rate.

In an additional aspect of the invention, a method of wireless communication includes sending, from a first wireless communications device to a second wireless communications device, a downlink page pending for the second wireless communications device. The method further includes receiving, at the first wireless communications device from a relay wireless communications device, a relayed connection request from the second wireless communications device. The method further includes sending from the first wireless communications device to the second wireless communications device, a connection setup signal in response to the relayed connection request. The method further includes receiving, at the first wireless communications device from the relay wireless communications device, a relayed connection complete signal and relayed service request.

In an additional aspect of the invention, an apparatus includes a processor configured to generate a link confirmation signal and a transceiver configured to associate with a relay wireless communications device during a first awake period common to the first wireless communications device and the relay wireless communications device. The transceiver is further configured to monitor for a stay alive signal from the relay wireless communications device during a second awake period that occurs at a first periodic rate regardless of whether there is traffic to receive. The transceiver is further configured to send the link confirmation signal to the relay wireless communications device during a third awake period that occurs at a second periodic rate regardless of whether there is traffic to transmit.

In an additional aspect of the invention, an apparatus includes a processor configured to generate a discovery broadcast signal and a transceiver configured to send, to a second wireless communications device, the discovery broadcast signal during a first awake period that occurs at a first periodic rate. The transceiver is further configured to receive, from the second wireless communications device, an association request signal during a second awake period. The transceiver is further configured to send, to the second wireless communications device, a stay alive signal during a third awake period that occurs at a second periodic rate. The transceiver is further configured to monitor for a link confirmation signal from the second wireless communications device during a fourth awake period that occurs at a third periodic rate.

In an additional aspect of the invention an apparatus includes a processor configured to determine that a downlink page is pending for a second wireless communications device and a transceiver configured to send, to the second wireless communications device, the downlink page. The transceiver is further configured to receive, from a relay wireless communications device, a relayed connection request from the second wireless communications device. The transceiver is further configured to send, to the second wireless communications device, a connection setup signal in response to the relayed connection request. The transceiver is further configured to receive, from the relay wireless communications device, a relayed connection complete signal and relayed service request.

In an additional aspect of the invention, a computer-readable medium having program code recorded thereon includes code for causing a first wireless communications device to associate with a relay wireless communications device during a first awake period, code for causing the first wireless communications device to monitor for a stay alive signal from the relay wireless communications device during a second awake period that occurs at a first periodic rate regardless of whether there is traffic to receive, and code for causing the first wireless communications device to send a link confirmation signal to the relay wireless communications device during a third awake period that occurs at a second periodic rate regardless of whether there is traffic to transmit.

In an additional aspect of the invention, a computer-readable medium having program code recorded thereon includes code for causing a first wireless communications device to send, to a second wireless communications device, a discovery broadcast signal during a first awake period that occurs at a first periodic rate, code for causing the first wireless communications device to receive, from the second wireless communications device, an association request signal during a second awake period, code for causing the first wireless communications device to send, to the second wireless communications device, a stay alive signal during a third awake period that occurs at a second periodic rate, and code for causing the first wireless communications device to monitor for a link confirmation signal from the second wireless communications device during a fourth awake period that occurs at a third periodic rate.

In an additional aspect of the invention, a computer-readable medium having program code recorded thereon includes code for causing a first wireless communications device to send, to a second wireless communications device, a downlink page for the second wireless communications device, code for causing the first wireless communications device to receive, from a relay wireless communications device, a relayed connection request from the second wireless communications device, code for causing the first wireless communications device to send, to the second wireless communications device, a connection setup signal in response to the relayed connection request, and code for causing the first wireless communications device to receive, from the relay wireless communications device, a relayed connection complete signal and relayed service request.

In an additional aspect of the invention, an apparatus includes means for associating with a relay wireless communications device during a first awake period, means for monitoring for a stay alive signal from the relay wireless communications device during a second awake period that occurs at a first periodic rate regardless of whether there is traffic to receive, and means for sending a link confirmation signal to the relay wireless communications device during a third awake period that occurs at a second periodic rate regardless of whether there is traffic to transmit.

In an additional aspect of the invention, an apparatus includes means for sending, to a second wireless communications device, a discovery broadcast signal during a first awake period that occurs at a first periodic rate, means for receiving, from the second wireless communications device, an association request signal during a second awake period, means for sending, to the second wireless communications device, a stay alive signal during a third awake period that occurs at a second periodic rate, and means for monitoring for a link confirmation signal from the second wireless communications device during a fourth awake period that occurs at a third periodic rate.

In an additional aspect of the invention, an apparatus includes means for sending, to a second wireless communications device, a downlink page pending for the second wireless communications device, means for receiving, from a relay wireless communications device, a relayed connection request from the second wireless communications device, means for sending, to the second wireless communications device, a connection setup signal in response to the relayed connection request, and means for receiving, from the relay wireless communications device, a relayed connection complete signal and relayed service request.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
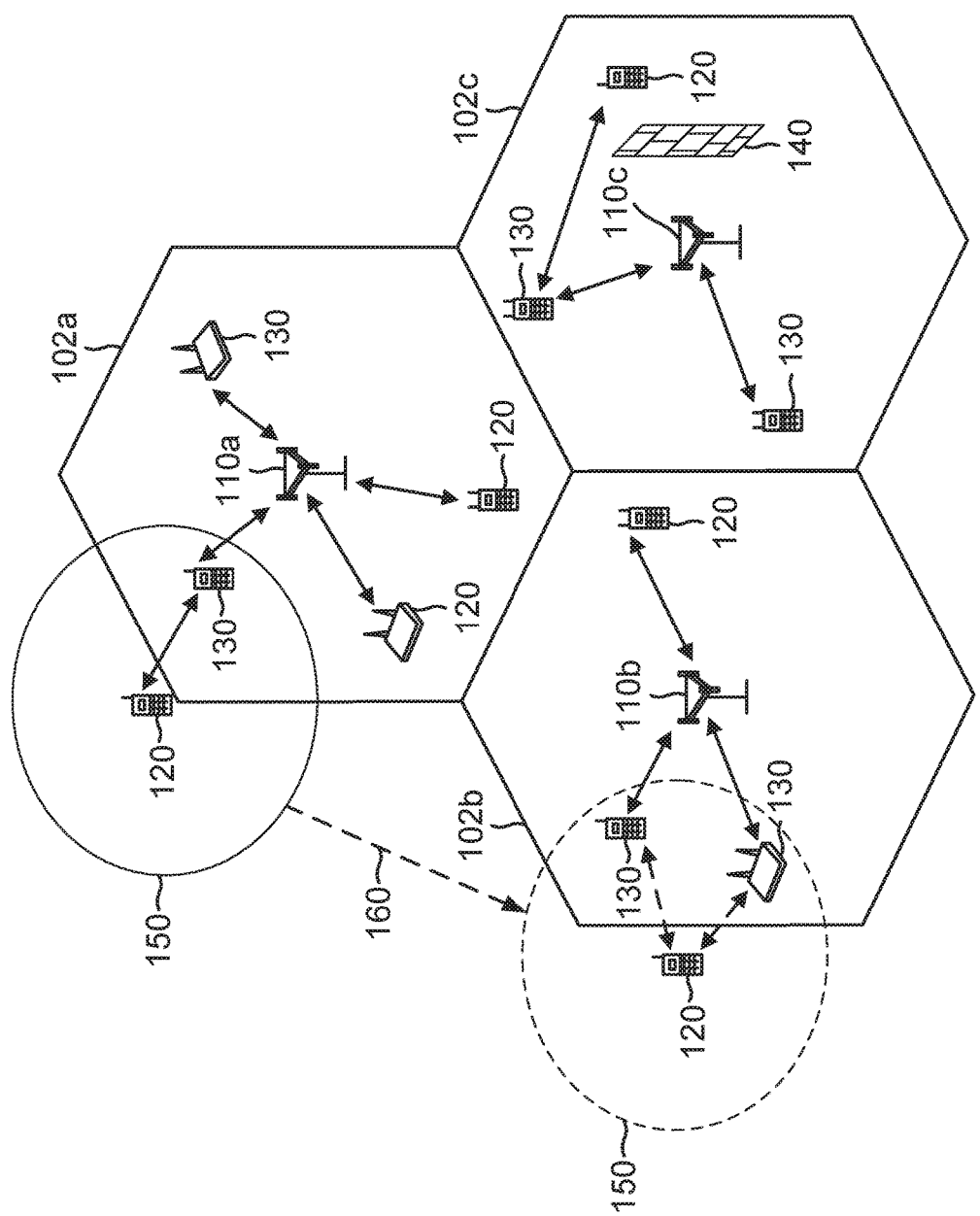
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to manage the mobility and downlink paging of IOE devices in a manner that provides more efficient signaling (e.g., improving energy efficiency). Leaf IOE devices may refer to those devices that rely on other devices to relay signals between them and a destination base station. Relay IOE devices may refer to devices that provide relay services to the leaf IOE devices. Relay IOE devices may be IOE devices or other types of user equipment (UE) that do not have the same power constraints/targets as IOE devices. Further, a relay IOE device may itself be a leaf IOE device from the perspective of another relay IOE device, thereby forming a mesh network with one or multiple hops between leaf and target base station. For purposes of simplicity, reference will be made herein to leaf IOE devices as those that seek relay assistance, and relay IOE devices as those that offer relay assistance, regardless of their position in an overall mesh network.

In an embodiment, available relay IOE devices may utilize discovery broadcasts to trigger associations with leaf IOE devices. For example, an available relay IOE device may transmit its discovery broadcast to leaf IOE devices within range. The discovery broadcast may contain information useful to leaf IOE devices in selecting a relay IOE device to associate with, and may also include a periodicity that the relay IOE devices will send stay alive signals for the purpose of confirming a good link. A leaf IOE device that receives the discovery broadcast, and determines to associate with that particular relay IOE device, responds with an association request signal that includes identifying information and, in some embodiments, a periodicity at which the leaf IOE device will send link confirmation signals (e.g., a periodicity selected to balance mobility latency versus overhead considerations), and a predicted uplink periodicity of traffic (e.g., over time). In such embodiments, the association request sent in response to the discovery broadcast is directed specifically to the relay IOE device for which association is sought.

Once the association is established, the leaf IOE device may periodically send link confirmation signals to the associated relay IOE device at the periodicity indicated in its association request signal, and the relay IOE device may periodically send stay alive signals at the periodicity indicated in its discovery broadcast signal. Each IOE device separately determines that the connection is still alive upon receipt of these signals.

So long as the link remains, the link confirmations and stay alive messages may continue. Should the relay IOE device stop receiving the link confirmations when expected, it may determine that a link breakage between it and the leaf IOE device has occurred. In analogous fashion, if the leaf IOE device does not receive a stay alive message from the relay IOE device when expected, it may determine that a link breakage has occurred. In this situation, the leaf IOE device may attempt to revert back to uplink direct communication with a base station (e.g., a base station from which it may receive downlink information but that otherwise imposes a heavy power burden). In this way, the leaf IOE device may attempt to continue to meet any communication needs while it searches for another relay IOE device. Once a new relay IOE device is located (for example, by accessing a list of possible relay IOE devices it maintains based on a prior history of discovery broadcasts and/or waiting for the next discovery broadcast(s)), the leaf IOE device may attempt association as discussed above. Should a new association occur, the new relay IOE device may notify the new relay IOE device's base station of the new association. The new base station may, in turn, notify the old base station that served the prior relay IOE device of the update.

In an embodiment, downlink paging may take advantage of the relay association described above. For example, when a base station determines that it has a downlink page in queue for a leaf IOE device, it may send the downlink page to the leaf IOE device either without the use of a relay IOE device (e.g., because base station has sufficient transmit power and/or power constraints may be lax on the base station) or with the use of the associated relay IOE device to relay the downlink page (e.g., because the leaf IOE is out of range of the base station itself and/or the base station has a power constraint that prevents it from reaching the leaf IOE device). The leaf IOE device may receive the downlink page and respond by sending a connection request to the base station via the associated relay IOE device. The base station may, in turn, respond to the connection request with a connection setup signal, which may be sent directly to the leaf IOE device or through the relay IOE device. The leaf IOE device may receive the connection setup signal and respond by sending a connection setup complete signal and a service request to the base station. This may also be relayed through the associated relay IOE device, thereby completing the downlink paging cycle.

In another embodiment of downlink paging, use of a non-associated relay IOE device may be advantageous. For example, all associated relays may be asleep when the base station determines that a downlink page should be sent to the leaf IOE device. This may occur when the amount of downlink traffic in queue for the leaf IOE device exceeds the capacity of the scheduled number of awake cycles. In such a case, the base station may coordinate with the leaf IOE device during normal downlink paging (e.g., using an associated relay device) to coordinate scheduling extra awake cycles at the leaf IOE device. The base station may then send a downlink page directly to the leaf IOE device during one of these extra awake cycles. The leaf IOE device, because its associated relay IOE device may be asleep during the extra awake cycles, may locate a non-associated relay IOE device (e.g., based on a list of discovery broadcasts maintained at the leaf IOE device), and send a device to device (D2D) connection request to the non-associated relay IOE device. The non-associated relay IOE device may respond with a D2D connection setup signal, completing the D2D connection and forming a mesh network connection between the leaf IOE device and the base station via the new relay IOE device. The embodiment may then proceed with downlink paging as described above by using the new associated relay IOE device in place of the asleep (but potentially still associated) relay IOE device.

FIG. 1 illustrates a wireless communication network 100 in accordance with various aspects of the present disclosure. In an embodiment, the wireless communication network 100 may include one or more mesh networks in communication with each other and/or one or more core networks. The wireless network 100 may include a number of base stations 110. A base station 110 may include an evolved Node B (eNodeB or eNB) in the LTE context, for example. A base station may also be referred to as a base transceiver station or an access point. For simplicity of discussion, it will be referred to herein as a base station. It will be recognized that there could be one to many base stations, as well as be an assortment of different types such as macro, pico, femto base stations, and/or other devices that include at least some capabilities of a base station.

The base stations 110 communicate with IOE devices 120 and 130 as shown. IOE devices 120/130 may be an example of types of user equipment (UE). One or more of the IOE devices 120/130 may also be referred to as internet of things (IoT) devices with corresponding functionality; reference will be made herein to IOE devices for simplicity of discussion.

In some embodiments, IOE devices 120 are referred to as "leaf" IOE devices 120 in a mesh network and IOE devices 130 are referred to as "relay" IOE devices 130 in a mesh network to specifically describe their respective functionality according to embodiments of the present disclosure. Leaf IOE devices 120 may send data and/or receive data via one or more relay IOE devices 130. Relay IOE devices 130 may act as relay between one or more leaf IOE devices 120 and one or more base stations 110. A leaf IOE device 120 may also be a relay IOE device 130 from the perspective of another IOE device, and vice versa. Leaf IOE devices 120 and relay IOE devices 130 may either be stand-alone or integrated within other devices. The leaf IOE devices 120 and/or relay IOE devices 130 may capture information that is then relayed to a remote system, such as via a base station 110 (and/or one or more relay IOE devices 130). One or both of leaf IOE devices 120 and relay IOE devices 130 may have limited power resources because they are integrated with other devices or objects, such as to render those devices or objects "smart," and be expected to be able to operate for long periods of time without replacement or recharge, e.g. days, weeks, months, or years. Each of the leaf IOE devices 120 and relay IOE devices 130 may awake at predefined time intervals according to a pre-determined schedule in order to decrease their power consumption.

As shown in FIG. 1, base station 110a may communication with the leaf IOE devices 120 and relay IOE devices 130 that are within the cell 102a, the base station 110b may communicate with the leaf IOE devices 120 and relay IOE devices 130 within the cell 102b, and the base station 102c may communicate with the leaf IOE devices 120 and relay IOE devices 130 within the cell 102c. These cells are exemplary only; a given network environment may include any number of base stations 110 and corresponding cells 102. An IOE device 120 or 130 may communicate with a base station 110 via an uplink and a downlink. The downlink (or forward link) refers to the communication link from a base station 110 to an IOE device 120 or 130. The uplink (or reverse link) refers to the communication link from an IOE device 120 or 130 to a base station 110. It will be recognized that the devices communicating with a given base station 110 may include a mix of both an IOE device 120 or 130 as well as other types of UEs such as mobile phones or other types of mobile computing devices.

The leaf IOE devices 120 and relay IOE devices 130 and UEs may be dispersed throughout the wireless network 100, and each IOE device 120 or 130 may be stationary or mobile. A UE or IOE may also be referred to as a terminal, a mobile station, a subscriber unit, etc. Some particular examples of an IOE 120 or 130 may be a GPS location beacon, an implanted heartrate monitor, a utility meter, a weather monitor, a drone, an entertainment device, a hub, a gateway, an appliance, a wearable, peer-to-peer and device-to-device components/devices (including fixed, stationary, and mobile), IoT devices, etc. The wireless communication network 100 is one example of a network to which various aspects of the disclosure apply.

The leaf IOE devices 120 and relay IOE devices 130 may form a mesh network wherein leaf IOE devices 120 associate with one or more relay IOE devices 130, which relay signals between leaf IOE devices 120 and base stations 110. As will be further described below, there are various ways that the leaf IOE devices 120 may be paired up with relay IOE devices 130 for association.

In an embodiment, there may be an obstruction between a leaf IOE device 120 and a base station 110 that prevents a direct link between the two, illustrated as an obstruction 140 in cell 102c in FIG. 1. For example, a leaf IOE device 120 in the basement of a building (e.g., monitoring a utility) may not have a clear signal to a base station 110, such that the ground around the basement serves as an obstruction 140. A relay IOE device 130 aboveground, however, may have a connection to a base station 110, and the leaf IOE device 120 may connect to the relay IOE device 130, which in turn connects to the base station 110 to relay data to and from the leaf IOE device 120, allowing the leaf IOE device 120 to communicate with the base station 110 via the relay IOE device 130.

In another example, a leaf IOE device 120 may not have any notable obstructions 140 between itself and a base station 110, but may instead be out of range to successfully connect to the base station 110 without an intermediary. For example, a leaf IOE device 120 may have a range 150 (e.g., uplink range), as shown in FIG. 1, that covers a relay IOE device 130 but does not reach the base station 110a. In some embodiments, the leaf IOE device 120 may be within a downlink range of a base station 110a while not in an uplink range 150. The relay IOE device 130 in cell 102a is illustrated as being within range of both the leaf IOE device 120 and the base station 110, and therefore may relay communications between the leaf IOE device 120 and the relay IOE device 130. Furthermore, a relay IOE device 130 may connect to one or more other relay IOE devices 130 to form a link to a base station 110.

In another embodiment, a leaf IOE device 120 may be mobile, for example moving along a path 160 in the illustrated example of FIG. 1. As the leaf IOE device 120 moves along path 160, it may move out of range of the relay IOE device 130 in the cell 102a, thus losing its link to base station 110a. As will be further described below, the leaf IOE device 120 recognizes that it has lost its link with the relay IOE device 130 and searches for either another relay IOE device 130 to reassociate with or a base station 110 to directly connect to. Shown in phantom is a position of a leaf IOE device 120 when it searches for new relay IOE devices 130 to associate with. In this example there are two relay IOE devices 130 within range 150 of the leaf IOE device 120 when it searches. As will be further described below, the leaf IOE device 120 may select one of the available relay IOE devices 130 to associate with based on various parameters.

In the above embodiments, a leaf IOE device 120 may send and receive signals directly to and from a particular relay IOE device 130 or indirectly to and from the particular relay IOE device 130 via one or more other relay IOE devices 130. In a similar manner, a relay IOE device 130 may send and receive signals directly to and from a base station 110 or a leaf IOE device 120, or the relay IOE device 130 may send and receive signals indirectly to and from the base station 110 or the leaf IOE device 120 via a one or more other relay IOE devices 130.

Figure 2:
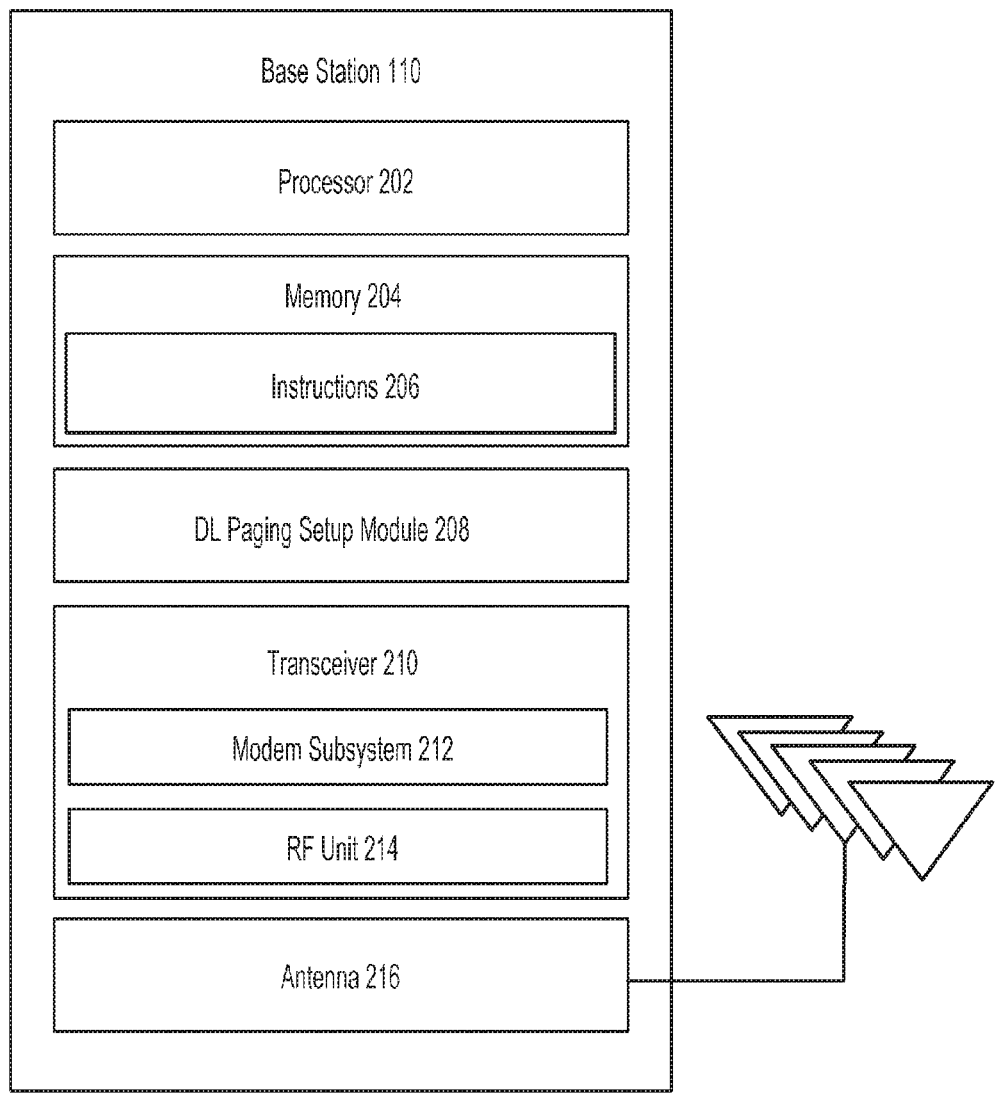
FIG. 2 is a block diagram illustrating an exemplary wireless communications device in accordance with various aspects of the present disclosure.

FIG. 2 is a block diagram of an exemplary base station 110 according to embodiments of the present disclosure. The base station 110 may include a processor 202, a memory 204, a downlink paging setup module 208, a transceiver 210, and an antenna 216. These elements may be in direct or indirect communication with each other, for example via one or more buses. As mentioned above with respect to FIG. 1, the base station 110 may communicate with multiple UEs, such as leaf IOE devices 120 and/or relay IOE devices 130.

The processor 202 may include a central processing unit (CPU), a digital signal processor (DSP), an application-specific integrated circuit (ASIC), a controller, a field-programmable gate array (FPGA) device, another hardware device, a firmware device, or any combination thereof configured to perform the operations described herein with reference to the base station 110 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 302), random access memory (RAM), magnetoresistive random access memory (MRAM), read-only memory (ROM), programmable read-only memory (PROM), erasable programmable read-only memory (EPROM), electronically erasable programmable read-only memory (EEPROM), flash memory, a solid state memory device, one or more hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the base station 110 in connection with embodiments of the present disclosure. Instructions 206 may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The downlink paging setup module 208 of the base station 110 may be used, in some embodiments, to determine whether it is necessary to schedule awake periods, also known as "wake up" periods, with a leaf IOE device 120 in excess of the device's normally scheduled awake periods to handle a volume of downlink traffic that is arriving at the base station 110 for the leaf IOE device 120. For example, the downlink paging setup module 208 may be aware of the periodicity of awake periods of a given leaf IOE device 120 based on previous communications between the base station 110 and the leaf IOE device 120 (whether directly or via one or more relay IOE devices 130). The downlink paging setup module 208 may also be aware of an amount of downlink traffic that is arriving at the base station 110 for the leaf IOE device 120 (e.g., through a network backbone, etc.). Based on these parameters, the module may be able to determine that downlink traffic is arriving frequently enough that the normally scheduled awake periods of the leaf IOE device 120 are not sufficient to transmit all of the downlink traffic in queue within an acceptable time frame.

In the case that the downlink paging setup module 208 determines that the regularly scheduled awake periods are not sufficient, the downlink paging setup module 208 may coordinate with the leaf IOE device 120 to schedule additional awake periods for transmission of downlink traffic. This behavior and the handling of the downlink traffic in this case is described further below with respect to FIG. 8.

The transceiver 210 may include a modem subsystem 212 and a radio frequency (RF) unit 214. The transceiver 210 is configured to communicate bi-directionally with other devices, such as one or more leaf IOE devices 120 and relay IOE devices 130. The modem subsystem 212 may be configured to modulate and/or encode data according to a modulation and coding scheme (MCS), e.g., a low-density parity check (LDPC) coding scheme, a turbo coding scheme, a convolutional coding scheme, etc.

The RF unit 214 may be configured to process (e.g., perform analog to digital conversion or digital to analog conversion, etc.) modulated/encoded data from the modem subsystem 212 (on outbound transmissions) or transmissions originating from another source such as a leaf IOE device 120 or a relay IOE device 130. Although shown as integrated together in transceiver 210, the modem subsystem 212 and the RF unit 214 may be separate devices that are coupled together at the base station 110 to enable the base station 110 to communicate with other devices.

The RF unit 214 may provide the modulated and/or processed data, e.g. data packets, to the antenna 216 for transmission to one or more other devices such as leaf IOE device 120 and relay IOE device 130. After the transceiver 210 receives data for transmission, e.g. a downlink page, the modem subsystem 212 may modulate and/or encode the data in preparation for transmission. The RF unit 214 may receive the modulated and/or encoded data packet and process the data packet prior to passing it on to the antenna 216. This may include, for example, transmission of data messages to one or more leaf IOE devices 120 or relay IOE devices 130 according to embodiments of the present disclosure. The antenna 216 may further receive data messages transmitted from a leaf IOE device 120 and/or relay IOE device 130, and provide the received data messages for processing and/or demodulation at the transceiver 210. As illustrated, the antenna 216 may include multiple antennas of similar or different designs in order to sustain multiple transmission links, although other antenna configurations including a single antenna may also be used.

Figure 3:
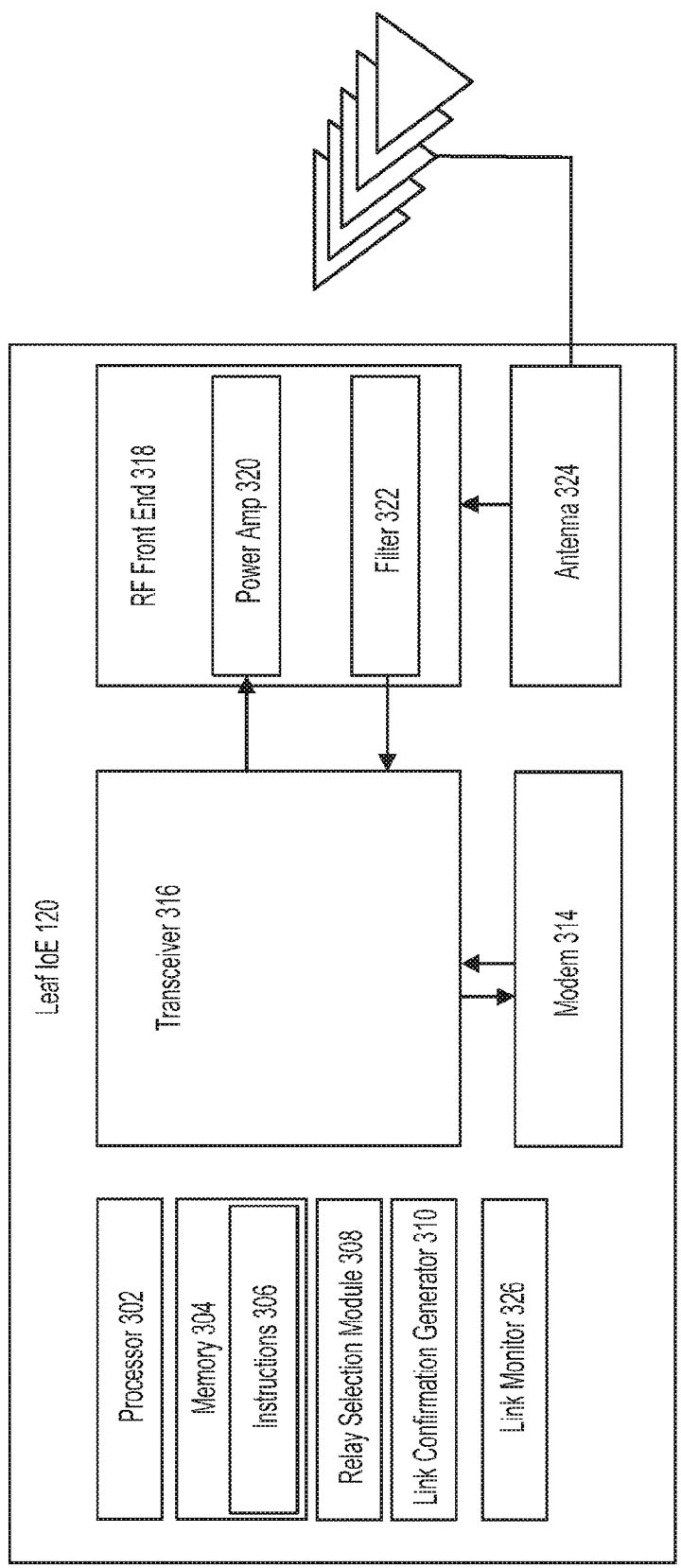
FIG. 3 is a block diagram illustrating an exemplary wireless communications device in accordance with various aspects of the present disclosure.

FIG. 3 is a block diagram of an exemplary leaf IOE device 120 according to embodiments of the present disclosure. The leaf IOE device 120 may include a processor 302, a memory 304, a relay selection module 308, a link confirmation generator 310, a modem 314, a transceiver 316, an RF front end 318, an antenna 324, and a link monitoring module 326. These elements may be in direct or indirect communication with each other, for example via one or more buses. As mentioned above with respect to FIG. 1, the leaf IOE device 120 may communicate with relay IOE devices 130 that are within range, other leaf IOE devices 120 within range, as well as base stations 110 that are within range.

The processor 302 may include a CPU, a DSP, an ASIC, a controller, a FPGA device, another hardware device, a firmware device, or any combination thereof configured to perform the operations described herein with reference to the leaf IOE device 120 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the leaf IOE device 120 in connection with embodiments of the present disclosure.

The relay selection module 308 may be configured to choose, out of a selection of one or more relay IOE devices 130 within range 150 of leaf IOE device 120, a relay IOE device 130 to associate with (e.g., based on one or more parameters) in order to communicate with a base station 110 in the mesh network 100. As described above, the leaf IOE device 120 may receive various parameters from potential relay IOE devices 130, including the energy consumption from the relay IOE device 130 to the base station 110, the number of additional relay IOE devices 130 required to reach base station 110 from the relay IOE device 130, the timing of awake cycles of the relay IOE device 130, or the like. These parameters may be gathered by the leaf IOE device 120 by receipt of discovery broadcasts sent by potential relay IOE devices 130 to all leaf IOE devices 120 within range, or by other appropriate requests or broadcasts.

This information may be used by the relay selection module 308 to determine parameters such as the total energy consumption from the leaf IOE device 120 to the base station 110, the number of relay IOE devices 130 required to reach base station 110 from leaf IOE device 120, whether the awake cycles of the leaf IOE devices 120 and relay IOE devices 130 overlap, or the like. The relay selection module 308 may, for example, seek to minimize total energy consumption, but may choose to prioritize overlapping awake cycles of the leaf IOE device 120 and the relay IOE device 130. Once a relay IOE device 130 has been selected for association, the relay selection module 308 may further generate an association request signal, such as association request signal 520 of FIG. 5, to be sent to the selected relay IOE device 130 to begin association between the leaf IOE device 120 and the relay IOE device 130. Once the association request signal is generated, it may be passed to the modem subsystem 314 for encoding.

The link confirmation generator 310 may be configured to generate link confirmation signals for transmission to associated relay IOE devices 130. Upon association, the leaf IOE device 120 may inform the relay IOE device 130 that link confirmation signals will be sent at a certain period to the relay IOE device 130 so that the relay may confirm that the link to the leaf IOE device 120 is still alive. Alternatively, the periodicity of the link confirmation signals may be preset and known to both participating devices. In some embodiments, the link confirmation signal may be a buffer status report (BSR) signal that also includes information on whether or not the leaf IOE device 120 has uplink traffic pending. In such embodiments, the link confirmation generator 310 may communicate with other modules such as memory 304 to check for pending uplink traffic while generating the BSR signal. The function of the link confirmation signal is described in more detail below with respect to FIGS. 5 and 6. Once the link confirmation signal 208 is generated, it may be sent to the modem subsystem 314 for encoding.

The modem subsystem 314 may be configured to modulate and/or encode data according to a modulation and coding scheme (MCS), e.g., a low-density parity check (LDPC) coding scheme, a turbo coding scheme, a convolutional coding scheme, etc.

The transceiver 316 may include a transmitter and a receiver and any other components to allow transmission and reception of data, for example to process (e.g., perform analog to digital conversion or digital to analog conversion, etc.) modulated/encoded data from the modem subsystem 314 (on outbound transmissions) or transmissions originating from another source such as a relay IOE device 130 or a base station 110. For the transmitter, this may include digital to analog conversion, a local oscillator, and upconversion of baseband signals to the selected transmission frequency, to name just a few examples. For the receiver, this may include a down converter to put the received signal at baseband, a baseband filter, and an analog-to-digital converter to name a few examples.

The RF front end 318 may include a filter 322, which may be for example a band-pass filter to filter out-of-band signals. The RF front end 318 may also include an impedance matching circuit and an amplifier 316. Although illustrated as separate, as will be recognized some aspects described above with respect to the transceiver 316 may be performed by the RF front end 318 (e.g., upconversion, downconversion, and mixing) and vice versa. The RF front end 318 may provide the modulated and/or processed data, e.g. data packets, to the antenna 324 for transmission to relay IOE devices 130 or the base station 110.

The antenna 324 may include one or multiple antennas of similar or different designs in order to sustain a single transmission link or multiple transmission links. The antenna 324 of the leaf IOE device 120 may transmit data provided from the transceiver 316 after modulation and coding from the modem subsystem 314 and amplification at the RF front end 318. The antenna 324 of the leaf IOE device 120 may also receive data from multiple sources, including from relay IOE devices 130 and/or a base station 110. The antenna 324 may feed the received data to the RF front end 318. When data received from the antenna 324 is filtered by the filter 322, the received signal is input to the transceiver 316.

Figure 5:
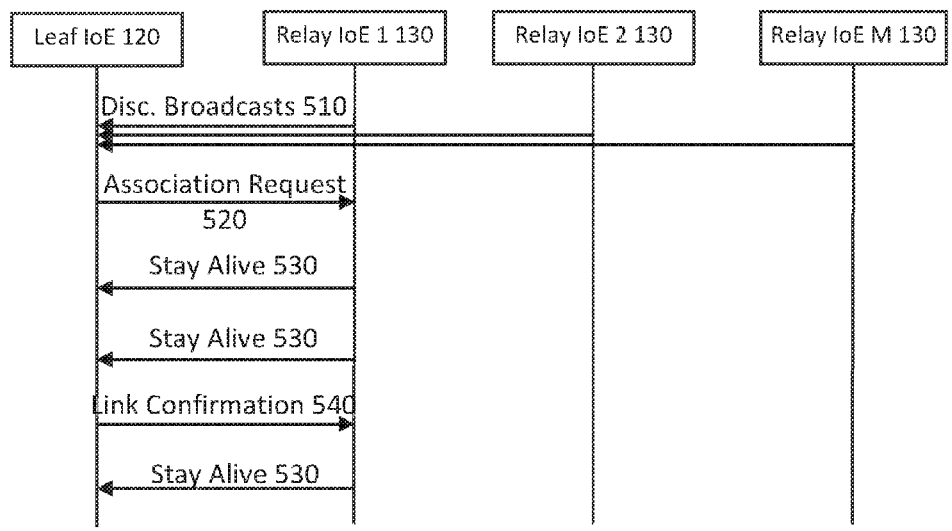
FIG. 5 is a protocol diagram illustrating exemplary signaling aspects between leaf devices, relay devices, and base stations in accordance with various aspects of the present disclosure.

Link monitoring module 326 may monitor the data output of transceiver 316 for stay alive signals from an associated relay IOE device 130 (in other words, a relay IOE device 130 with which the leaf IOE device 120 is already associated), such as stay alive signal 530 in FIG. 5. As will be further described below, stay alive signals (also referred to as keep alive signals) indicate that the associated relay IOE device 130 is still within range 150 of leaf IOE device 120, and is therefore still a valid path to base station 110. If stay alive signals are not received at an expected periodicity after association with a relay IOE device 130, link monitoring module 326 may determine that a link breakage has occurred and cause the leaf IOE device 120 to initiate re-association with a new target relay IOE device 130, as is further described below with reference to FIG. 6.

Figure 4:
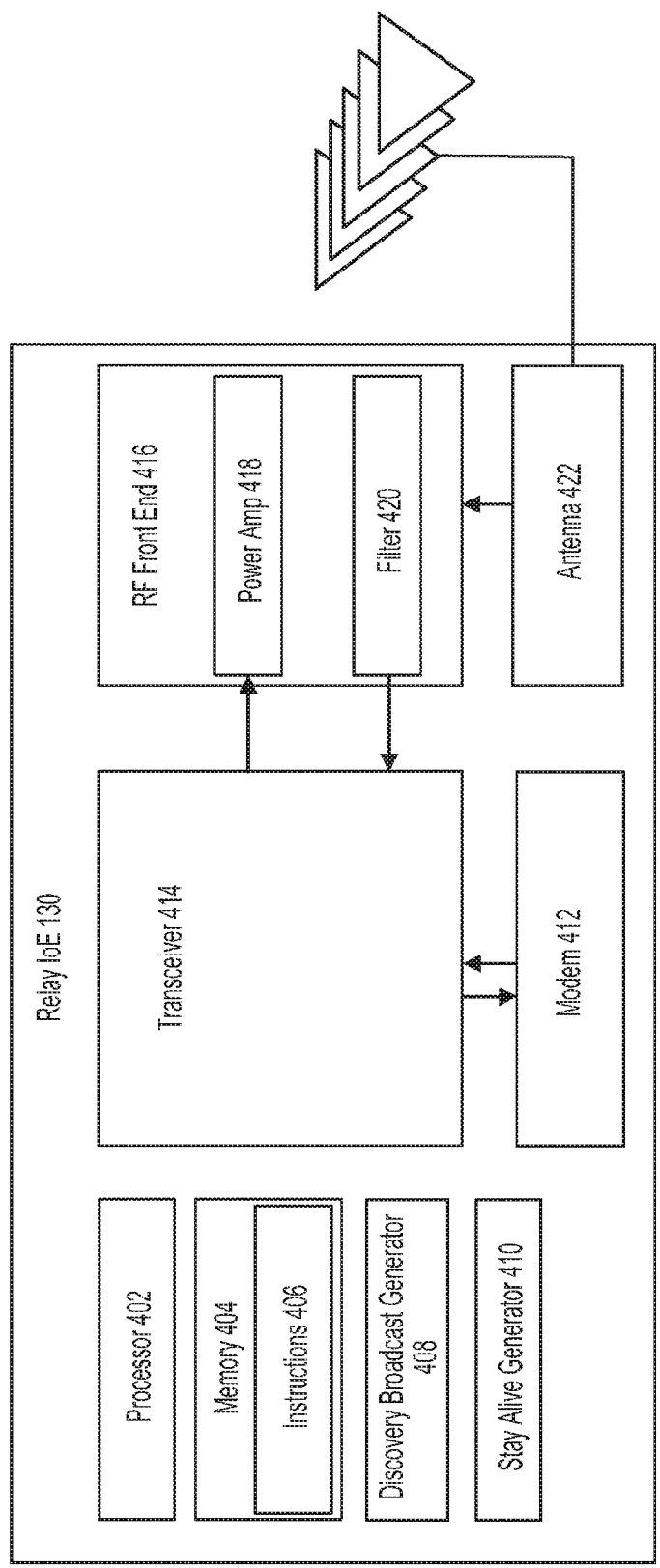
FIG. 4 is an illustration of an exemplary wireless communications device in accordance with various aspects of the present disclosure.

FIG. 4 is a block diagram of an exemplary relay IOE device 130 according to embodiments of the present disclosure. The relay IOE device 130 may include a processor 402, a memory 404, a discovery broadcast generator 408, a stay alive generator 410, a modem 412, a transceiver 414, an RF front end 416, and an antenna 422. These elements may be in direct or indirect communication with each other, for example via one or more buses. As mentioned above with respect to FIG. 1, the leaf IOE device 120 may communicate with relay IOE devices 130 that are within range, as well as base stations 110 that are within range. As relay IOE device 130 and leaf IOE device 120 are very similar, the processor 402, memory 404, instructions 406, modem 412, transceiver 414, RF front end 416, and the antenna 422 may be substantially similar in their description to the processor 302, memory 304, instructions 306 (albeit to implement embodiments of the present disclosure with respect to relay IOE devices 130), modem 314, transceiver 316, RF front end 318, and the antenna 324, respectively.

Figure 6:
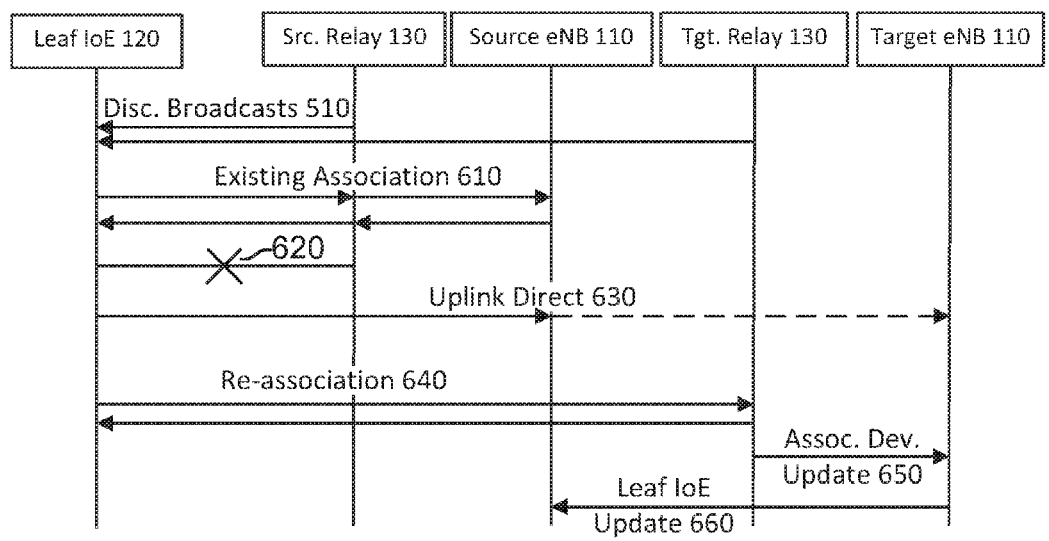
FIG. 6 is a protocol diagram illustrating exemplary signaling aspects between leaf devices, relay devices, and base stations in accordance with various aspects of the present disclosure.

The discovery broadcast generator 408 may be configured to generate a discovery broadcast signal, such as discovery broadcast signals 510 of FIGS. 5 and 6. In some embodiments, the discovery broadcast signal may be used to inform any potential leaf IOE devices 120 within range that relay IOE device 130 is available. The discovery broadcast signal may include information that a leaf IOE device 120 uses to select a relay IOE device 130 to associate with. This may include, for example, the energy consumption from the relay IOE device 130 to the base station 110, the number of relay IOE devices 130 required to reach base station 110 from this relay IOE device 130, the timing of awake cycles of the relay IOE device 130, or the like. Once the discovery broadcast signal is generated, it may be passed to the modem subsystem 412 for encoding.

Stay alive generator 410 may be configured to generate a stay alive signal. In an embodiment, the stay alive signals may be periodically transmitted to associated leaf IOE devices 120 without any prompting by the leaf IOE devices 120, in order to confirm that the relay IOE device 130 is still linked to the associated leaf IOE device 120. Once the stay alive signal is generated, it may be passed to the modem subsystem 412 for encoding. As discussed in more detail below, the stay alive signal may have a different periodicity than the leaf IOE device 120's link confirmation signals.

Although illustrated as separate devices, a leaf IOE device 120 may include the elements described with respect to a relay IOE device 130, and a relay IOE device 130 may include the elements described with respect to a leaf IOE device 120, as a given IOE device may be a leaf IOE device and a relay IOE device, within the context of a mesh network, at the same or at different times.

Referring now to FIG. 5, there is illustrated a signal diagram 500 for an embodiment of associating a leaf IOE device 120 with a relay IOE device 130. There may be a plurality of relay IOE devices 130 within range (e.g., range 150 of FIG. 1) of leaf IOE device 120. In the exemplary embodiment of FIG. 5, no base station 110 is within range 150 (e.g., uplink range) of the leaf IOE device 120, but a base station 110 may be within range of one or more of the relay IOE devices 130. In some embodiments, there may not be a base station 110 in range of any of the relay IOE devices 130 of FIG. 5, but other relay IOE devices 130 within range of a base station 110 may be within range of the relay IOE devices 130 of FIG. 5, and the relay IOE devices 130 of FIG. 5 may use the other relay IOE devices 130 as relays to the base station 110, resulting in a multi-hop route from leaf IOE device 120 to base station 110.

In the embodiment of FIG. 5, a plurality of relay IOE devices 130 (e.g., relay IOE devices 130 labeled 1-M in FIG. 5) may periodically broadcast discovery broadcast signals 510 during a common awake period, called a discovery period, of the leaf IOE device 120 and the relay IOE devices 130. In some embodiments, a discovery period is prearranged (e.g., synchronized between devices) and known to IOE devices in the mesh network 100. This discovery period may occur relatively infrequently, and many of the IOE devices may have other awake periods between each discovery period. In this embodiment, discovery periods may be spaced several hours to a day apart in order to keep power consumption low.

The discovery broadcast signals 510 may contain information useful to leaf IOE devices 120 for selection of a relay IOE device 130 to associate with, such as an identifier of the relay IOE device 130, the energy consumption from the relay IOE device 130 to the base station 110, the number of additional relay IOE devices 130 required to reach base station 110 from the relay IOE device 130, the timing of awake cycles of the relay IOE device 130, or the like. Leaf IOE devices 120 may receive the discovery broadcast signals 510 and use the information contained therein to select a relay IOE device 130 to associate with, as described above with respect to FIG. 3. Furthermore, the leaf IOE devices 120 may maintain a list of relay IOE devices 130 from which they have received discovery broadcasts 510 (currently and/or in the past), along with any information contained in the discovery broadcasts 510, such as the awake periods of the corresponding relay IOE devices 130.

After the leaf IOE device 120 has selected a relay IOE device 130 for association, the association may be initiated by sending an association request signal 520 to the selected relay IOE device 130. The association request signal 520 may function to inform the relay IOE device 130 that association is desired by the leaf IOE device 120. The association request signal 520 may function, for example, according to one or more embodiments of association described in U.S. Provisional Patent Application No. 62/217,422, which is hereby incorporated by reference in its entirety as if fully set forth herein and for all applicable purposes. The leaf IOE device 120 sends this specifically to the selected relay IOE device, as opposed to the discovery broadcast signal that may be broadcast to those devices within range.

Upon receipt of the association request signal 520 at the selected relay IOE device 130 and associated connection setup signaling between the leaf IOE device 120 and the relay IOE device 130 (e.g., as described in U.S. Provisional Patent Application No. 62/217,422), association of the leaf IOE device 120 with the relay IOE device 130 may be complete, forming a relay mesh connection, and the devices may proceed with communicating data. The associated relay IOE device 130 may in some embodiments inform a serving base station 110 of the association, thus directing the serving base station 110 to route any downlink traffic to the leaf IOE device 120 through the associated relay IOE device 130. The relay IOE device 130 may send any helpful information to the serving base station 110, including the awake periods of the leaf IOE device 120 and the expected uplink traffic periodicity of the leaf IOE device 120.

In some embodiments, leaf IOE devices 120 and relay IOE devices 130 may transmit and receive information during regularly spaced transmission periods, or frame periods, corresponding to awake periods of the IOE devices. The transmission periods of the leaf IOE device 120 and the selected relay IOE device 130 may overlap. The association request signal 520 may, for example, inform the associated relay IOE device 130 that a link confirmation signal 540 will be sent every $K_L$ transmission periods to the relay IOE device 130 (e.g., $K_L$ may be every one or more transmission periods). The value of $K_L$ may be selected to balance the tradeoffs between mobility latency and overhead (i.e., a longer periodicity renders the signaling overhead smaller, but increases mobility latency time, while a shorter periodicity renders the signaling overhead greater, but decreases the mobility latency time). The relay IOE device 130 may use this information to confirm that the leaf IOE device 120 is still within range of the relay IOE device 130. In some embodiments, the link confirmation signal 540 may be a buffer status report (BSR), which may also indicate to the relay IOE device 130 whether or not the leaf IOE device 120 has uplink traffic to send to the relay IOE device 130. For example, even when the leaf IOE device 120 has no uplink traffic to send, the leaf IOE device 120 still sends the BSR as the link confirmation signal 550 to the relay IOE device 130.

Likewise, the leaf IOE device 120 may expect a stay alive signal 530 to be received from the associated relay IOE device 130 every $K_R$ transmission periods, regardless of traffic at that particular time, in order to confirm that the connection remains unbroken. In other words, the stay alive signaling is independent of traffic, and may be sent and received even when no traffic is occurring or pending. In some embodiments, the stay alive signal 530 may be broadcast to all leaf IOEs 120 within broadcast range of the relay IOE device 130 to save on signal overhead. In such an embodiment, the leaf IOEs 120 must coordinate a common awake period with the relay IOE 130 to monitor for the stay alive broadcast.

A failure to receive the link confirmation signal 540 at the associated relay IOE device 130 or a failure to receive the stay alive signal 530 at the leaf IOE device 120 may indicate a link breakage. In the case of a link breakage, the relay IOE device 130 may simply save signal overhead by ceasing to send stay alive signals 530 and ceasing to monitor for link confirmation signals 540. Additionally, the relay IOE device 130 may notify the serving base station 110 of the breakage, so that the base station 110 may itself seek an alternative path to the desired leaf IOE device 120. The leaf IOE device 120, in contrast, may be triggered to search for a new relay IOE device 130 when it detects a link breakage. This is discussed further with respect to FIG. 6 below.

The parameters $K_R$ and $K_L$ may be different (e.g., stay alive signals 530 and link confirmation signals 540, respectively, may be sent at different periodic rates). $K_R$ may be set so that $K_L$ is larger than $K_R$, such that multiple stay alive signals 530 are sent by the relay IOE device 130 for each link confirmation signal 540 sent by the leaf IOE device 120. This may be advantageous when the leaf IOE 120 has stricter power constraints on it than the relay IOE device 130.

The choice of parameter $K_L$ may involve a tradeoff between signal overhead and mobility latency, where mobility latency refers to the amount of delay until a link breakage is detected, whether caused by the mobility of a leaf IOE device 120 or of a relay IOE device 130 (or both). Link breakage may be caused by relative movement that occurs between two devices between consecutive communications, and the delay between stay alive signals 530 or link confirmation signals 540 may determine the maximum delay until the link breakage is detected. For example, the larger $K_L$ is (i.e., the longer between instances of link confirmation signals 540), the lower overhead is as less signals are sent, and it may be possible for the leaf IOE device 120 to reduce its number of awake cycles by increasing $K_L$. However, if either the leaf IOE device 120 or the associated relay IOE device 130 are mobile, increasing $K_L$ means increasing the time that a link can be broken before the breakage is detected, triggering the leaf IOE device 120 to find a new relay IOE device 130 before it may resume sending data to base station 110, as is further described below with reference to FIG. 6.

Turning now to FIG. 6, there is illustrated a signal diagram 600 for an embodiment of associating a leaf IOE device 120 with a new relay IOE device 130 after a link breakage has been detected and determined by the leaf IOE device 120.

As shown, discovery broadcasts 510 sent by relay IOE devices 130 may be received by leaf IOE devices 120 (e.g., as described above with respect to FIG. 5) to establish an initial association. As illustrated in FIG. 6, the associated relay IOE device 130 is referred to as the source relay IOE device 130 and the base station 110 to which the source relay IOE device 130 connects is referred to as the source eNB 110.

Existing association 610 may include the normal behavior of an associated leaf IOE device 120 and relay IOE device 130 as described above, for example transmission of traffic (uplink and/or downlink) as well as the period transmission and receipt of link confirmation and stay alive signals.

When a link breakage 620 occurs, it may be detected at leaf IOE device 120 as a failure to receive an expected stay alive signal 530, as described above. The leaf IOE device 120 may begin to search for a new target relay IOE device 130 to associate with. If possible, as a fallback the leaf IOE device 120 may directly uplink to the source eNB 110 using uplink direct signaling 630, which may include, for example, signaling used by a UE for communication to an eNB in an LTE environment in addition to uplink/downlink traffic. This may be less efficient than connecting to a relay IOE device 130, even when a source eNB 110 is in range, if the source eNB 110 is far away from the leaf IOE device 120. In this case, the power level used to communicate with the source eNB 110 may be unacceptably high, and therefore direct uplink may be a contingency for periods when no relay IOE devices 130 are available.

The leaf IOE device 120 may attempt re-association 640 with one or more target relay IOE devices 130 so as to not rely on the uplink direct signaling 630 for a long period of time. The leaf IOE device 120 may consult the a list of known relay IOE devices 130 it maintains locally (e.g. in memory 304 in FIG. 3), such as the list established above with respect to FIG. 5, in order to select a new target relay IOE device 130. The leaf IOE device 120 may attempt to associate with a target relay IOE device 130 chosen from the list. If the target relay IOE device 130 is no longer available, for example if leaf IOE devices 120 or relay IOE devices 130 have moved out of range 150. The leaf IOE device 120 may then select the next best target relay IOE device and attempt to establish an association, and may continue in this fashion until an association is formed or the list is exhausted. In addition or alternatively, the leaf IOE device 120 may wait to receive one or more new discovery broadcasts 510. Either way, once a target relay IOE device 130 is located, leaf IOE device 120 may associate with the target relay IOE device 130 as described above with respect to FIG. 5. For example, leaf IOE device 120 may send association request signal 520 to the target relay IOE device 130.

After association between leaf IOE device 120 and target relay IOE device 130 is completed, the target relay IOE device 130 may communicate an associated devices update 650 to a target eNB 110 to which the target relay IOE device 130 is connected. The associated devices update 650 may indicate that the target relay IOE device 130 has a new associated leaf IOE device 120 (and include, for example, an identifier of that associated leaf IOE device 120).

The target eNB 110 may, in turn, communicate a leaf IOE device update 660 to the source eNB 110, identifying that leaf IOE device 120 has changed association from source relay IOE device 130 to target relay IOE device 130. For example, base stations 110 may be connected via a core backbone (e.g., an X2 interface), the internet, or the like that allows them to share information despite not having overlapping wireless communication ranges (or, in some embodiments where there is overlap, via an over-the-air interface).

Figure 7:
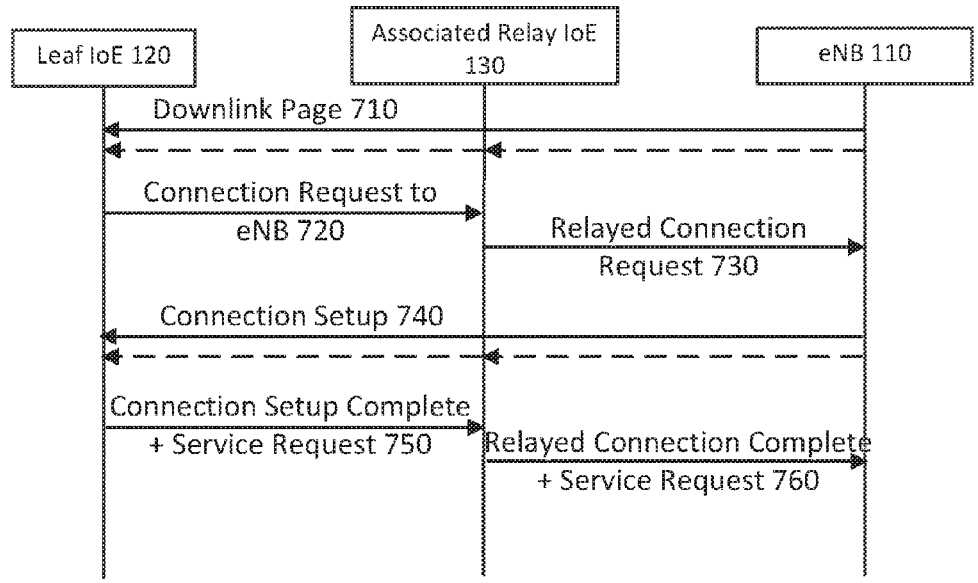
FIG. 7 is a protocol diagram illustrating exemplary signaling aspects between leaf devices, relay devices, and base stations in accordance with various aspects of the present disclosure.

Referring now to FIG. 7, there is illustrated a signal diagram 700 for an embodiment of downlink paging from a base station 110 to a leaf IOE device 120 via an already-associated relay IOE device 130. As illustrated in FIG. 7, the base station 110 to which the associated relay IOE device 130 connects is referred to as the eNB 110.

After a leaf IOE device 120 and a relay IOE device 130 are associated by either of the methods described above with respect to FIG. 5 or 6, during the course of normal communications, the eNB 110 may receive data for the leaf IOE device 120 (e.g., via an external source such as via a packet network). As described above with reference to FIG. 5, the eNB 110 may be aware of the awake periods of both the leaf IOE device 120 and the relay IOE device 130, allowing the eNB 110 to communicate with the IOE devices during already-scheduled awake periods. In the exemplary embodiment of FIG. 7, downlink traffic becomes available infrequently enough that the process described below may occur during a normally scheduled awake period of the leaf IOE device 120 and the associated relay IOE device 130.

In order to notify leaf IOE device 120 that it should stay awake to receive data, the eNB 110 may page the leaf IOE device 120. To do so, according to embodiments of the present disclosure, a downlink page signal 710 may be sent from the eNB 110 to the leaf IOE device 120, either directly or via the associated relay IOE device 130. When the eNB 110 transmits directly to the leaf IOE device 120, the system may be said to operate in Uplink Mesh Downlink Direct (UMDD) mode. This may occur, for example, where the eNB 110 has sufficient downlink transmit power to reach the leaf IOE device 120, but the leaf IOE device 120 utilizes mesh network communication via associated relay IOE device 130 to communicate with the eNB 110 due to power constraints. If the leaf IOE device 120 is outside the transmission range of the eNB 110 the downlink page signal 710 may be sent to the associated relay IOE device 130 for relaying to the leaf IOE device 120.

When the leaf IOE device 120 receives the downlink page signal 710, whether directly or via associated relay IOE device 130, it may respond by sending a connection request to the eNB 110. This may occur in the same or in a different awake period as when the downlink page signal 710 is received. As noted above, due to the power constraints on the leaf IOE device 120, the connection request 720 may be relayed to the eNB 110 via the associated relay IOE device 130. The signal may then be relayed from the associated relay IOE device 130 to the eNB 110 as relayed connection request 730.

When the eNB 110 receives the relayed connection request 730, it may respond to the leaf IOE device 120 by sending a connection setup signal 740. As described above with reference to the downlink page 710, the connection setup signal 740 may be sent either directly to the leaf IOE device 120 or relayed via associated relay IOE device 130.

Upon receipt of the connection setup signal 740 at the leaf IOE device 120, the downlink connection setup may be complete. The leaf IOE device 120 may inform the eNB 110 of this by sending a connection setup complete signal, and may additionally request that the downlink traffic be sent by sending a service request. Both may be sent as combined connection setup complete and service request signal 750. As described above with respect to the connection request signal 720, this signal is sent to relay IOE device 130. The relay IOE device 130 sends the combined signal on to the eNB 110 as relayed connection complete and service request signal 760.

Figure 8:
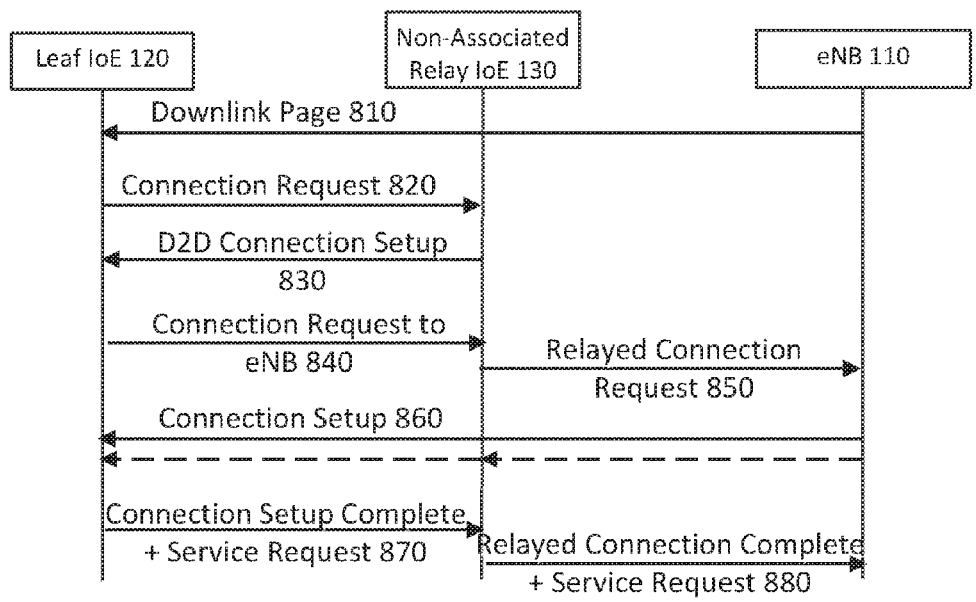
FIG. 8 is a protocol diagram illustrating exemplary signaling aspects between leaf devices, relay devices, and base stations in accordance with various aspects of the present disclosure.

Referring now to FIG. 8, there is illustrated a signal diagram 800 for an embodiment of downlink paging from a base station 110 to a leaf IOE device 120 via a non-associated relay IOE device 130. As illustrated in FIG. 8, the base station 110 to which the leaf IOE device 120 and non-associated relay IOE device 130 connect is referred to as the eNB 110. The use of a non-associated relay IOE device 130 may be useful for multiple reasons, as will be described below.

In an embodiment, downlink traffic becomes available for a leaf IOE device 120 at the eNB 110 more frequently than the leaf IOE device 120 is awake (e.g., there is sufficient downlink traffic that existing awake periods are insufficient to complete). Accordingly, the eNB 110 may coordinate with the leaf IOE device 120 during one of the leaf IOE device 120's normal awake periods to schedule additional awake periods. For example, in the method 700 described with respect to FIG. 7, during downlink traffic transmission in a normally scheduled awake period of the leaf IOE device 120, the eNB 110 and leaf IOE device 120 may agree on additional awake periods for transmission of further downlink traffic. In an embodiment, it may be impractical for the relay IOE device 130 to schedule additional awake periods to correspond to the agreed-upon additional awake periods. For example, the relay IOE device 130 may already have scheduled multiple awake periods to communicate with one or more leaf IOE devices 120, and scheduling of further awake periods for the IOE device 130 may unacceptably increase energy consumption. The leaf IOE device 130 may instead connect to a non-associated relay IOE device 130 as described below.

In another embodiment, the leaf IOE device 120 is mobile and moving at such a speed that it does not maintain association with a given relay IOE device 130 for more than a single (or several) awake period of the leaf IOE device 120. This scenario is further described below with respect to FIG. 10. In such a case, the leaf IOE device 120 may choose to forego associating with any relay IOE device 130, and may instead use non-associated relay IOE devices 130 to form a mesh connection to eNB 110. In this embodiment, the eNB 110 may become aware of the leaf IOE device 120's scheduled awake periods from prior communications directly with the leaf IOE device 120, from communications with non-associated relay IOE devices 130 that the leaf IOE device 120 has communicated with recently, from communications with other eNBs 110 that the leaf IOE device 120 has communicated with recently, or the like.

In either of the above embodiments, the eNB 110 may receive data for the leaf IOE device 120 (e.g., via an external source such as via a packet network). As noted above, the eNB 110 may have scheduled additional awake periods with the leaf IOE device 120 for downlink traffic or may be aware of already-scheduled awake periods of the leaf IOE device 120. In order to notify leaf IOE device 120 to stay awake to receive data, the eNB 110 may page the leaf IOE device 120. To do so, according to embodiments of the present disclosure, a downlink page signal 810 may be sent from the eNB 110 to the leaf IOE device 120 during one of these additionally scheduled awake periods. In an embodiment, the downlink page signal 810 is sent directly to the leaf IOE device 120 since either the associated relay IOE device 130 is asleep or there is no associated relay IOE device 130. Otherwise, the downlink page signal 810 may be similar to downlink page signal 710 of FIG. 7.

When the leaf IOE device 120 receives the downlink page signal 810 from the eNB, it may find a non-associated relay IOE device 130 to form a mesh connection to eNB 110, since power constraints/policy may limit directly connecting to eNB 110. Accordingly, the leaf IOE device 120 may consult a list of known relay IOE devices 130 as described above with reference to FIG. 6 in order to select a relay device 130 for a device to device (D2D) connection that forms a leg of the mesh connection.

Upon selecting an appropriate relay IOE device 130, the leaf IOE device 120 may send a connection request 820 to the selected non-associated relay IOE device 130. The connection request 820 may include any information that would be helpful to the relay IOE device 130 in forming a D2D connection, such as an identifier for the leaf IOE device 120.

When the non-associated relay IOE device 130 receives the connection request 820, it may respond with a D2D connection setup signal 830, forming a D2D connection with the leaf IOE device 120 and a mesh connection from the leaf IOE device 120 to the eNB 110.

Once the D2D connection is formed, the leaf IOE device 120 may respond to the downlink page 810 in a substantially similar manner to that described above with respect to FIG. 7. For example, the leaf IOE device 120 may send connection request 840 to eNB 110 in similar fashion to connection request 720. The now-associated relay IOE device 130 may then relay the message to the eNB 110 by the non-associated relay IOE 130 as relayed connection request 850, in similar fashion to relayed connection request 730.

eNB 110, in response to receiving the relayed connection request 850, sends connection setup signal 860 to leaf IOE device 120, whether directly or via the now-associated relay IOE device 130 (e.g., similar to connection setup signal 740).

The leaf IOE device 120 responds with service request 870 after completing connection setup. The service request 870 is sent to now-associated relay IOE device 130 in similar fashion to connection setup complete and service request 750.

The now-associated relay IOE device 130 then relays a connection complete and service request 880 to eNB 110, similar to relayed connection complete and service request 760.

Figure 9:
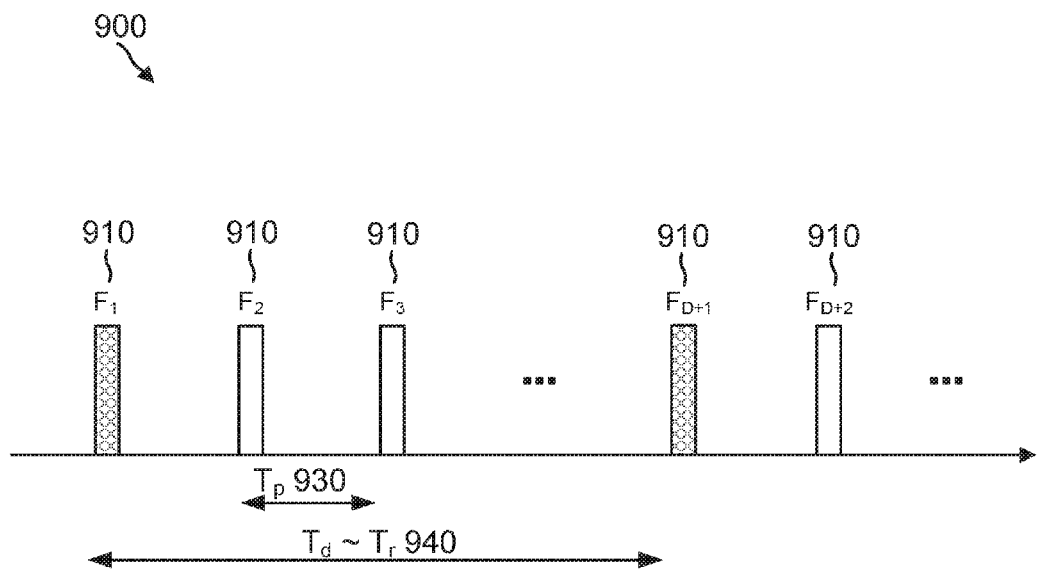
FIG. 9 illustrates a timing diagram of transmissions made by a wireless communications device in accordance with various aspects of the present disclosure.

Referring now to FIG. 9, there is illustrated a timing diagram 900 of transmissions made by a low mobility IOE, for example a leaf IOE device 120. This may also be referred to herein as a slow mobility regime. A plurality of periodic transmission periods 910 are shown. The periodic transmission periods 910 may each correspond to awake periods of the leaf IOE device 120, and the awake periods may be spaced some amount of time apart, and in particular discovery periods may be spaced some amount of time apart.

Uplink traffic is sent from the leaf IOE device 120 to the relay IOE device 130 at a packet periodicity (Tp) 930. In an embodiment (low mobility), the mobility of the leaf IOE device 120 is slow enough that the relay change time (Tr) is greater than the packet periodicity Tp 930 (meaning that the time to change relays is longer than the time to transmit multiple packets). In some embodiments, a discovery periodicity (Td) 940 may be approximately the same as the relay change periodicity, while in other embodiments they are different (e.g., Td may be greater than Tr or vice versa). For example, transmission periods 910 labeled $F_1$ and $F_{D+1}$ may be discovery periods (e.g., where available relay IOE devices 130 may transmit discovery broadcasts whether or not those are used to trigger association according to embodiments of the present disclosure). In a given discovery period, the leaf JOE device 120 may have moved out of range of an associated relay IOE device 130 and into range of a new set of relay IOE devices 130.

Accordingly, transmissions made during transmission periods 910 labeled $F_1$ and $F_2$ are sent via an associated relay JOE device 130 (e.g., a source relay IOE device 130 of FIG. 7) to a base station 110 (e.g., a source eNB 110). Thus, multiple periodic packets may be transmitted before a change in relay JOE device 130 occurs. At some point before a subsequent discovery period occurs, the leaf JOE device 120 may move outside the range of the source relay IOE device 130. As a result, the leaf IOE device 120 may use a new discovery period to locate a target relay JOE device 130 with which to associate. After associating with a target relay IOE device 130 at some point prior to $F_{D+2}$, the leaf IOE device 120 may continue communication with transmissions during transmission period 910 labeled $F_{D+2}$ via the different target relay JOE device 130 to the eNB 110 serving the target relay JOE device 130 (which may be a different base station 110 or the same base station 110 that was serving the source relay IOE device 130).

In some low mobility embodiments, leaf JOE devices 120 may find benefit in associating with a relay IOE device 130 as described above with reference to FIG. 5. For example, association with a relay IOE device 130 may save signaling overhead from trial and error attempts to form a D2D connection (as described above with reference to FIG. 6) with a non-associated relay. In this case, use of the downlink paging method of FIG. 7 may assume a higher priority, as it avoids the above noted trial and error. However, even in a slow mobility regime, downlink traffic may be available more frequently than the relay IOE device 130 is scheduled to be awake. In such cases, the downlink paging method of FIG. 8 may take priority at times.

Figure 10:
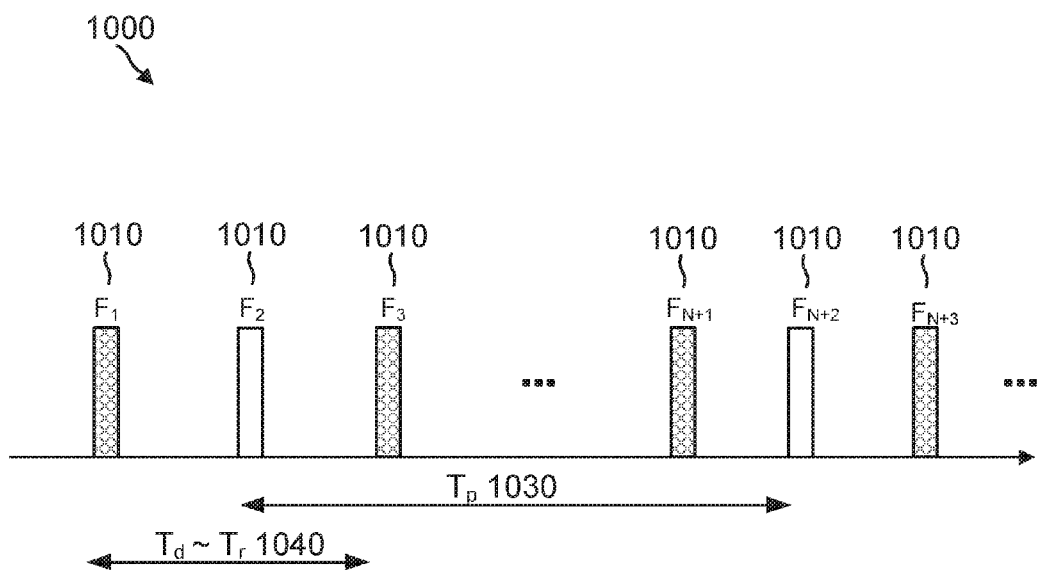
FIG. 10 illustrates a timing diagram of transmissions made by a wireless communications device in accordance with various aspects of the present disclosure.

Referring now to FIG. 10, there is illustrated a timing diagram 1000 for transmissions made by a high mobility JOE, for example a leaf JOE device 120.

A plurality of periodic transmission periods 1010 are shown. The periodic transmission periods 1010 may correspond to awake periods of the leaf IOE device 120, and the awake periods may be spaced some amount of time apart, such as discussed above with respect to FIG. 9.

In an embodiment (high mobility), the mobility of the leaf IOE device 120 is fast enough that the relay change time (Tr) is less than the packet periodicity Tp 930 (meaning that the time to change relays is shorter than the time to transmit/receive multiple packets). Traffic is sent, such as from the leaf IOE device 120 to the relay IOE device 130, at a packet periodicity (Tp) 1030. In this embodiment, the leaf IOE device 120 is moving quickly enough that the relay change time (Tr) is less than the packet periodicity Tp 1030. In some embodiments, a discovery periodicity (Td) 1040 may be approximately the same as the relay change periodicity, while in other embodiments they are different (e.g., Td may be greater than Tr or vice versa). For example, transmission periods 1010 labeled $F_1$ and $F_3$ may be discovery periods (e.g., where available relay IOE devices 130 may transmit discovery broadcasts whether or not those are used to trigger association according to embodiments of the present disclosure).

In some high mobility embodiments, the leaf IOE device 120 may be moving so quickly that it does not remain within range of any given relay IOE device 130 for more than one transmission period. In such embodiments, there may be little to no advantage to be gained from associating with a relay IOE device 130. Instead, such embodiments may use the downlink paging method of FIG. 8 for downlink traffic.

Figure 11:
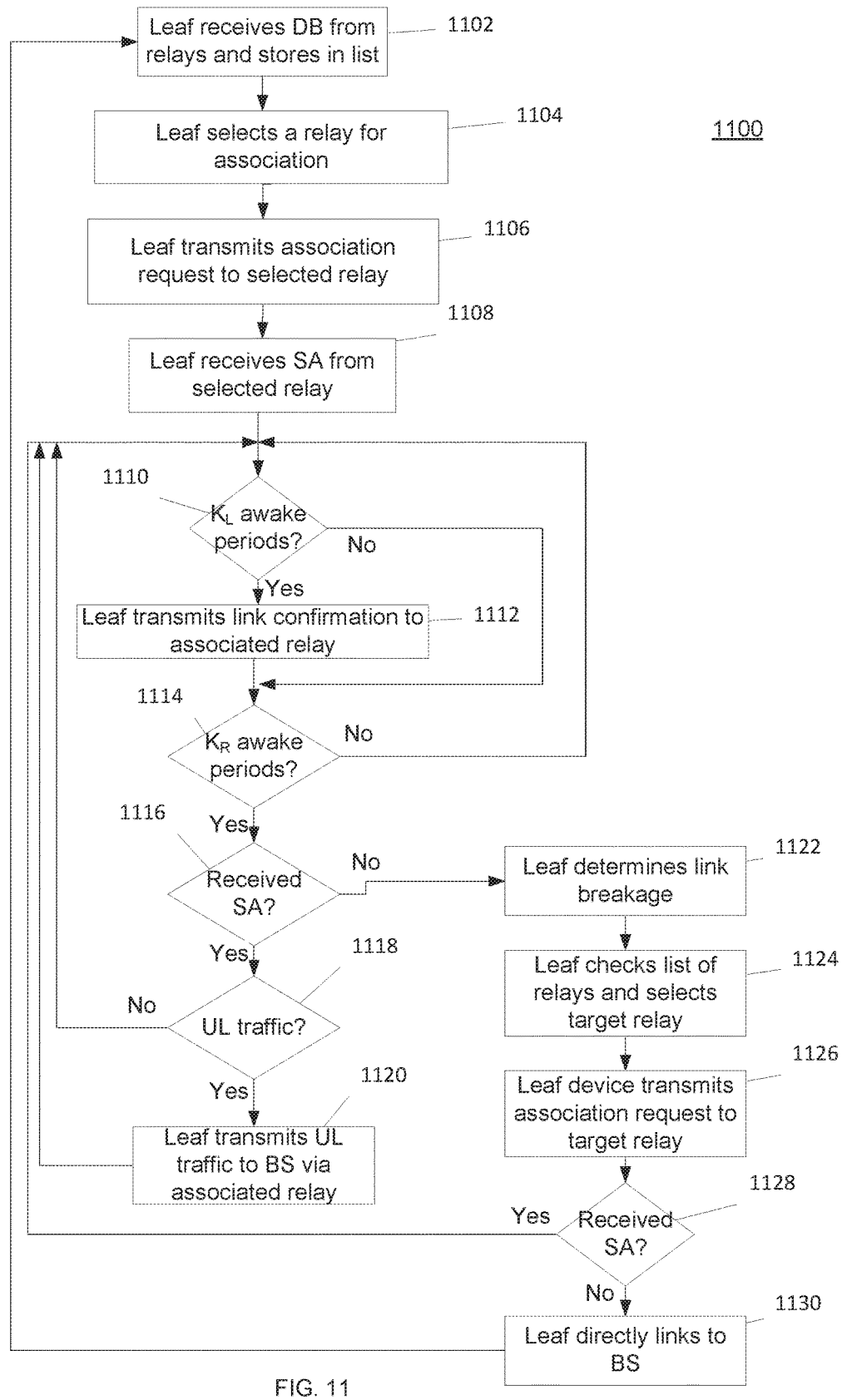
FIG. 11 illustrates a method for wireless communication in accordance with various aspects of the present disclosure.

Referring now to FIG. 11, there is illustrated a block diagram of a method 1100 for associating a leaf IOE device 120 with a relay IOE device 130 that has a path to a base station 110. For ease of illustration, reference will be made to the example using a given leaf IOE device 120, a given relay IOE device 130, and a given base station 110. It is understood that additional steps can be provided before, during, and after the steps of method 1100, and that some of the steps described can be replaced or eliminated from the method 1100.

At block 1102, during a first awake period, the leaf IOE device 120 receives discovery broadcast signals from one or more relay IOE devices 130 that are within broadcast range of the leaf IOE device 120. The discovery broadcast signals may be received all during the same, current awake period, all in a prior awake period, or some combination of the two. The leaf IOE device 120 stores information contained in the discovery broadcast signals in a list.

At block 1104, The leaf IOE device 120 uses the information stored in this list (whether stored previously or in the current awake period, or both) to select one of the one or more relay IOE devices 130 to associate with based on the information contained in the discovery broadcast signals, for example as described above with respect to FIG. 3.

At block 1106, during a awake period (e.g., the same awake period in which selection occurs) the leaf IOE device 120 sends an association request signal to the relay IOE device 130 selected at block 1104. In response, the relay IOE device 130 may send connection setup information to complete association.

At block 1108, the leaf IOE device 120 receives a stay alive signal from the selected relay IOE 130 during a awake period (e.g., a second awake period).

Moving to decision block 1110, during a third awake period the leaf IOE device 120 checks whether $K_L$ awake periods have elapsed yet. If not, the method 1100 moves to decision block 1114 as described below. If $K_L$ awake periods have elapsed at decision block 1110, the method 1100 moves to block 1112.

At block 1112, the leaf IOE device 120 sends a link confirmation signal to the associated relay IOE device 130 to seek confirmation that the link to the associated relay IOE device 130 is still active/has not broken.

Moving to decision block 1114, from either decision block 1110 or block 1112, during a awake period (e.g., the same third awake period or another period subsequent to that, depending on the respective periodicities of $K_L$ and $K_R$) the leaf IOE device 120 checks whether $K_R$ awake periods have elapsed.

If not, the method 1100 returns to decision block 1110 and proceeds as discussed above and below. If $K_R$ awake periods have elapsed at decision block 1114, then the method moves to decision block 1116.

At decision block 1116, the leaf IOE device 120 monitors for a stay alive signal from the relay IOE device 130. If the stay alive signal is received, the method 1100 proceeds to decision block 1118.

At decision block 1118, the leaf IOE device 120 checks for uplink traffic to be sent to the base station 110. If no uplink traffic is found, the method 1100 returns from decision block 1118 to block 1110 and proceeds as discussed above and below.

If instead at decision block 1118 uplink traffic is found, the method 1100 proceeds to block 1120.

At block 1120, the leaf IOE device 120 transmits the uplink data to the relay IOE device 130 during a common awake period (e.g., the same awake period or a different one). The method 1100 then returns from block 1120 to block 1110 to proceed as discussed above and further below.

Returning to decision block 1116, if a stay alive signal is not received from the relay IOE device 130 when expected, then the method 1100 proceeds to block 1122.

At block 1122, the leaf IOE device 120 determines that a link breakage has occurred, for example based on the fact that a stay alive signal was not received.

After determining a link breakage has occurred, at block 1124 the leaf IOE device 120 consults its list of relay IOE devices 130 (e g, maintained based on discovery broadcasts and/or stay alive signals received in previous and/or current awake periods) and selects one as a target relay IOE device 130.

At block 1126, the leaf IOE device 120 sends an association request signal to the target relay IOE device 130 identified and selected at block 1126.

At decision block 1128, if no stay alive signal is received from the target IOE device 130, then the leaf IOE device 120 determines that the target IOE device 130 is unavailable. In some embodiments, the method may repeat blocks 1124 to 1128 until a relay IOE device 130 is associated or until the list of potential relay IOE devices 130 is exhausted.

If the list becomes exhausted without a successful association with a relay, the method 1100 proceeds to block 1130, where the leaf IOE device 120 sends a direct uplink signal to the source base station 110 (e.g., that it was connected to via the now-missing relay IOE device 130, or alternatively to a different base station 110 of which the leaf IOE device 120 has knowledge). If the direct uplink attempt is successful, then the leaf IOE device 120 may continue transmitting and/or receiving data with the base station 110 while searching for a new target relay IOE device 130 (e.g., since a direct uplink connection may drain battery at the leaf IOE device 120 more quickly than is desired/planned).

The method 1100 returns from block 1130 to block 1102 and proceeds as described above and below (e.g., starting with the leaf IOE device 120 receiving discovery broadcasts from relay IOE devices 130).

Returning to decision block 1128, if the leaf IOE device 120 receives a stay alive from the target relay IOE device 130, the two may establish an association and the method may return to block 1110 as laid out above.

Figure 12:
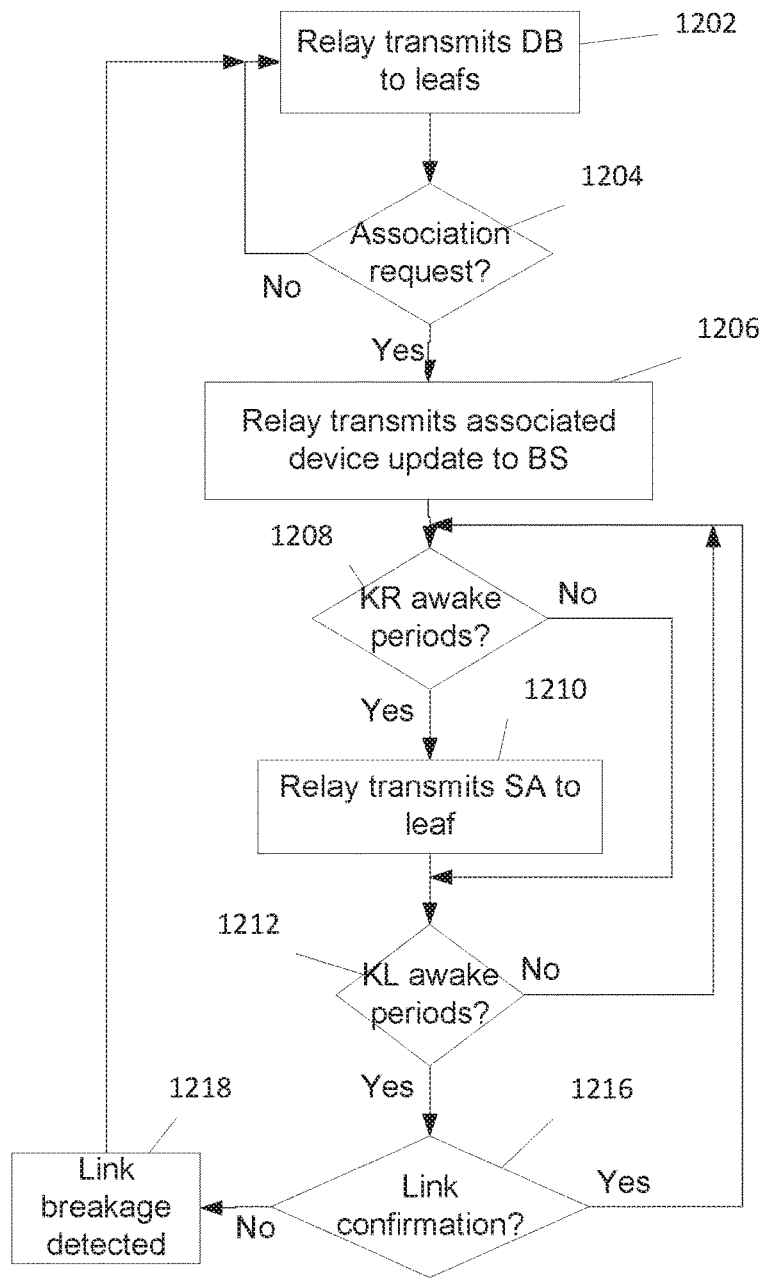
FIG. 12 illustrates a method for wireless communication in accordance with various aspects of the present disclosure.

Referring now to FIG. 12, there is illustrated a block diagram of a method 1200 for associating a relay IOE device 130 that has a path to a base station 110 with a leaf IOE device 120. For ease of illustration, reference will be made to the example using a given relay IOE device 130, a given leaf IOE device 120, and a given base station 110. It is understood that additional steps can be provided before, during, and after the steps of method 1200, and that some of the steps described can be replaced or eliminated from the method 1200.

At block 1202, during a first wake up period, a relay IOE device 130 transmits a discovery broadcast signal to one or more leaf IOE devices 120 that are within broadcast range of the relay IOE device 120. For simplicity of discussion, reference will be made herein to a single leaf IOE device 120.

At decision block 1204, during a wake up period (e.g., the same wake up period or a subsequent one) the relay IOE device 130 monitors for an association request signal from leaf IOE devices 120, indicating that the transmitting leaf IOE device 120 has determined to associate with the relay IOE device 130. If no association request signals are received, the method 1200 returns to block 1202 and proceeds as described above and below. If at least one association request signal is received, the method 1200 moves to block 1206.

At block 1206, the relay IOE device 130 completes association with the leaf IOE device 120 from which an association request signal was received. Relay IOE device 130 may transmit an associated device update to its serving base station 110 to inform the base station 110 of the association.

At decision block 1208, during a wake up period (e.g., a second wake up period or another period subsequent to that) the relay IOE device 130 checks whether $K_R$ awake periods have elapsed. If $K_R$ awake periods have not yet elapsed, the method 1200 proceeds to decision block 1212, which will be described below. If $K_R$ awake periods have elapsed, then the method 1200 moves to block 1210.

At block 1210, the relay IOE device 130 transmits a stay alive signal to the associated leaf IOE device 120 so that the leaf IOE device 120 may know that the link is still active. In some embodiments (e.g., where multiple leaf IOE devices 120 are associated with the relay IOE device 130), the stay alive signal is not directed at any particular leaf IOE devices 120, but is instead widely broadcast.

From either decision block 1208 or block 1210, the method 1200 proceeds to decision block 1212. At decision block 1212, during a wake up period (e.g., a second wake up period or another period subsequent to that) the relay IOE device 130 checks whether $K_L$ awake periods have elapsed. If $K_L$ awake periods have not yet elapsed, the method 1200 returns to decision block 1208 to proceed as described above and below (e.g., waiting for $K_R$ awake periods to transmit a stay alive signal). If $K_L$ awake periods have elapsed, then the method 1200 moves to decision block 1216.

At decision block 1216, the relay IOE device 130 monitors for an expected link confirmation signal from the associated leaf IOE device 120. If the expected link confirmation is received, the relay IOE device 130 may conclude that the link to the leaf IOE device 120 is alive, and the method 1200 may loop back to decision block 1208 (including relaying associated leaf IOE device 120 data where provided) until a link breakage is detected.

If no link confirmation signal is received, the method 1200 moves to block 1218. At block 1218, the relay IOE device 130 determines that a link breakage has occurred. The method 1200 then returns to block 1202 and proceeds as described above (e.g., starting with the relay IOE device 130 transmitting discovery broadcast signals, though the relay IOE device 130 may periodically transmit discovery broadcast signals regularly during the rest of the aspects discussed above with respect to FIG. 12).

Figure 13:
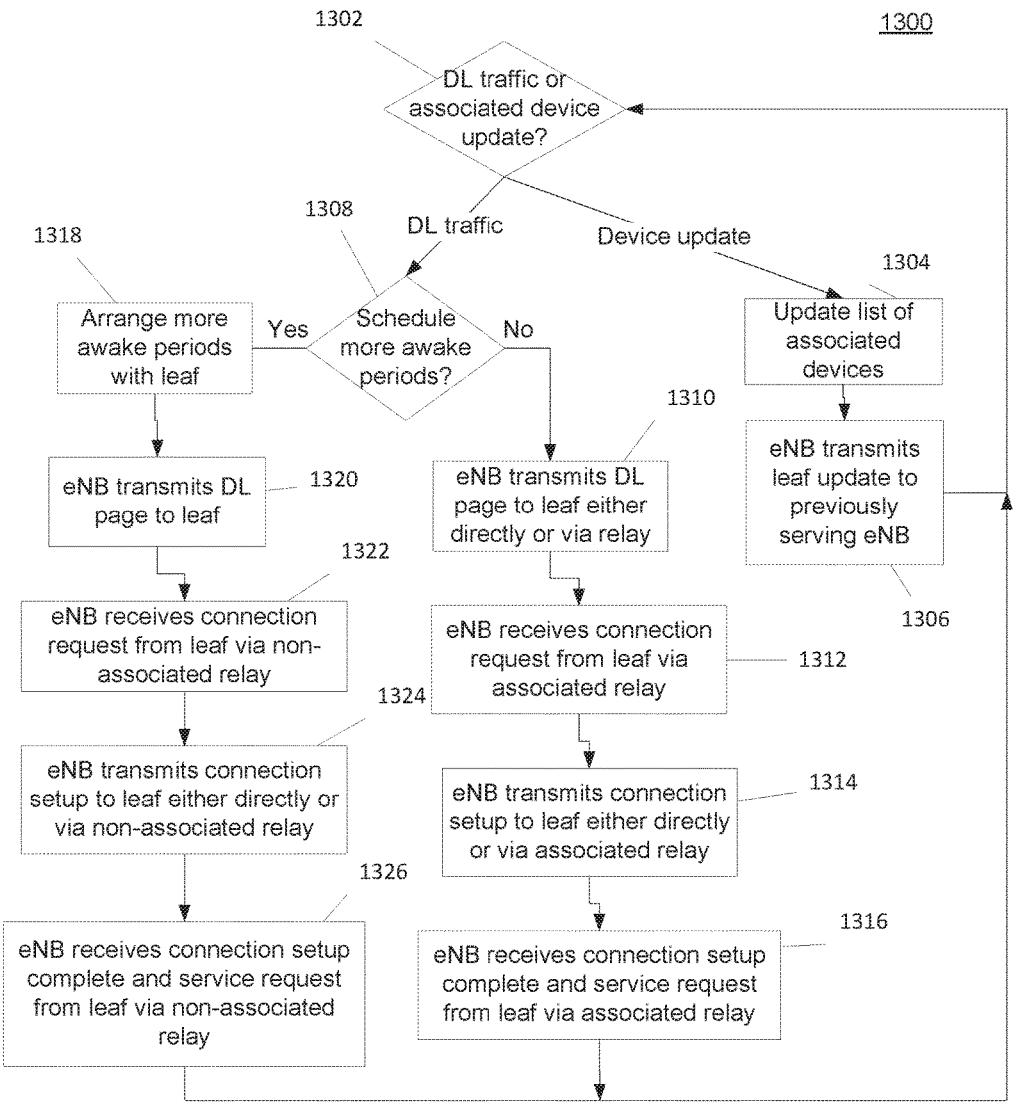
FIG. 13 illustrates a method for wireless communication in accordance with various aspects of the present disclosure.

Referring now to FIG. 13, there is illustrated a block diagram of a method 1300 for handling downlink paging from the base station 110 to leaf IOE devices 120 and updating records of associations between leaf IOE devices 120 and relay IOE devices 130 after link breakage. For ease of illustration, reference will be made to the example using a given base station 110, a given leaf IOE device 120, and a given relay IOE device 130. It is understood that additional steps can be provided before, during, and after the steps of method 1300, and that some of the steps described can be replaced or eliminated from the method 1300.

At block 1302, the base station 110 monitors for receipt of either downlink traffic intended for a leaf IOE device 120 from another device/network, such as a packet network, or an associated devices update signal from one or more relay IOE devices 130. If an associated devices update is received, the method 1300 moves to block 1304. If downlink traffic is received, the method 1300 moves to block 1308. Each will be addressed in turn below.

At block 1304, the base station 110 (also referred to as the target eNB in FIG. 6) uses information contained in the associated device update signal to update a list of associations between relay IOE devices 130 that the base station serves and leaf IOE devices 120 as described above with reference to FIG. 6. For example, the associated device update signal may indicate that a link breakage occurred (e.g., a leaf IOE device 120 has lost association with a source relay IOE device 130). The associated device update signal may further indicate that the leaf IOE device 120 has, in response, re-associated with the relay IOE device 130 (e.g., a target relay) from which the base station 110 received the associated device update signal. The associated device update signal may further contain information identifying a source base station 110 that serves the source relay IOE device 130.

At block 1306, the base station 110 transmits a leaf IOE device update signal to the source base station 110 identified in the associated device update signal. The leaf IOE device update signal may inform the source base station 110 that the leaf IOE device 120 is no longer associated with the source relay IOE 130. The leaf IOE device update signal may include a request that any further downlink pages for the leaf IOE device 120 be forwarded to the (target) base station 110. The method 1300 then returns to block 1302 and continues as described above and below (e.g., the base station 110 monitors for downlink traffic or an associated devices update signal).

Returning to decision block 1302, if downlink traffic is received for a leaf IOE device 120 that is associated with the base station 110, the method 1300 moves to decision block 1308.

At decision block 1308, the base station 110 determines whether downlink traffic for a leaf IOE device 120 is arriving at a rate such that the scheduled awake periods of the leaf IOE device 120 will not be sufficient to handle all of the downlink traffic. If the scheduled awake periods of the leaf IOE device 120 are sufficient to handle the volume of downlink traffic, the method 1300 moves to block 1310.

At block 1310, the base station 110 transmits a downlink page signal to the leaf IOE device 120 either directly or via an associated relay IOE device 130, as described above with respect to FIG. 7. Furthermore, blocks 1312 to 1316 below may correspond to the embodiment described with respect to FIG. 7.

At block 1312, in response to the downlink page signal, the base station 110 receives a relayed connection request from a leaf IOE device 120 via a relay IOE device 130 associated with the leaf IOE device 120.

At block 1314, in response to the connection request, the base station 110 transmits a connection setup signal to the leaf IOE device 120 either directly or via the associated relay IOE device 130.

At block 1316, in response to the connection setup signal, the base station 110 receives a relayed connection setup complete signal and service request (whether combined or in separate messages) from the leaf IOE device 120 via the associated relay IOE device 130. The method 1300 then returns to block 1302 and continues as described above and below (e.g., the base station 110 monitors for downlink traffic or an associated devices update signal).

Returning to decision block 1308, if the base station does determine that the rate of downlink traffic requires more awake periods, the method 1300 moves to block 1318.

At block 1318, the base station 110 coordinates with the leaf IOE device 120 to arrange for extra awake periods, as described above with reference to FIG. 8. Furthermore, blocks 1320 to 1326 below may correspond to the embodiment described in FIG. 8.

At block 1320, the base station 110 transmits a downlink page signal directly to the leaf IOE device 120. In some embodiments, the associated relay IOE device 130 to leaf IOE device 120 may be awake during the extra awake period that is used for this downlink page signal.

At block 1322, the base station 110 receives a relayed connection request from the leaf IOE device 120 via a non-associated relay IOE device 130. Based on this reception, the base station 110 may now that the non-associated relay IOE device 130 forms a mesh connection with the leaf IOE device 120.

At block 1324, the base station 110 transmits a connection setup signal to the leaf IOE device 120 either directly, or via the now-known (and newly associated) relay IOE device 130.

At block 1326, the base station 110 receives a relayed connection setup complete signal and a relayed service request from the leaf IOE device 120 via the newly-associated relay IOE device 130. At this point the downlink connection is established and base station 110 may proceed with transmitting the downlink traffic. The method 1300 then returns to block 1302 and continues as described above and below (e.g., the base station 110 monitors for downlink traffic or an associated devices update signal).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method comprising sending, from a first wireless communications device to a second wireless communications device, a downlink page pending for the second wireless communications device. The method further comprises receiving, at the first wireless communications device from a relay wireless communications device, a relayed connection request from the second wireless communications device. The method further comprises sending, from the first wireless communications device to the second wireless communications device, a connection setup signal in response to the relayed connection request. The method further comprises receiving, at the first wireless communications device from the relay wireless communications device, a relayed connection complete signal and relayed service request.

The method further includes wherein the first wireless communications device sends the downlink page to the second wireless communications device via the relay wireless communications device. The method further includes wherein the first wireless communications device sends the connection setup signal to the second wireless communications device via the relay wireless communications device. The method further includes wherein the first wireless communications device sends the downlink page to the second wireless communications device directly. The method further includes wherein the first wireless communications device sends the connection setup signal to the second wireless communications device directly. The method further includes receiving, at the first wireless communications device from the relay wireless communications device, an associated device update signal indicating that the second wireless communications device can be reached via the relay wireless communications device. The method further includes determining, at the first wireless communications device, based on information contained in the relayed connection request, that the second wireless communications device can be reached via the relay wireless communications device. The method further includes coordinating, at the first wireless communications device with the second wireless communications device, an awake period for sending the downlink page.

Embodiments of the present disclosure further include an apparatus comprising a processor configured to determine that a downlink page is pending for a second wireless communications device. The apparatus further comprises a transceiver configured to send, to the second wireless communications device, the downlink page. The transceiver is further configured to receive, from a relay wireless communications device, a relayed connection request from the second wireless communications device. The transceiver is further configured to send, to the second wireless communications device, a connection setup signal in response to the relayed connection request. The transceiver is further configured to receive, from the relay wireless communications device, a relayed connection complete signal and relayed service request.

The apparatus further includes wherein the transceiver is further configured to send the downlink page to the second wireless communications device via the relay wireless communications device. The apparatus further includes wherein the transceiver is further configured to send the connection setup signal to the second wireless communications device via the relay wireless communications device. The apparatus further includes wherein the transceiver is further configured to send the downlink page to the second wireless communications device directly. The apparatus further includes wherein the transceiver is further configured to send the connection setup signal to the second wireless communications device directly. The apparatus further includes wherein the transceiver is further configured to receive, from the relay wireless communications device, an associated device update signal indicating that the second wireless communications device can be reached via the relay wireless communications device. The apparatus further includes wherein the processor is further configured to determine, based on information contained in the relayed connection request, that the second wireless communications device can be reached via the relay wireless communications device. The apparatus further includes wherein the processor is further configured to coordinate, with the second wireless communications device, an awake period for sending the downlink page.

Embodiments of the present disclosure further include a computer-readable medium having program code recorded thereon, the program code comprising code for causing a first wireless communications device to associate with a relay wireless communications device during a first awake period. The program code further includes code for causing the first wireless communications device to monitor for a stay alive signal from the relay wireless communications device during a second awake period that occurs at a first periodic rate regardless of whether there is traffic to receive. The program code further includes code for causing the first wireless communications device to send a link confirmation signal to the relay wireless communications device during a third awake period that occurs at a second periodic rate regardless of whether there is traffic to transmit.

The computer-readable medium further includes code for causing the first wireless communications device to receive one or more discovery broadcast signals from one or more second wireless communications devices. The program code further includes code for causing the first wireless communications device to maintain a list of the one or more second wireless communications devices, the one or more second wireless communications devices identified from the one or more discovery broadcast signals. The program code further includes code for causing the first wireless communications device to select the relay wireless communications device from the list of one or more second during the first awake period. The computer-readable medium further includes code for causing the first wireless communications device to populate the list of the one or more second wireless communications devices based on one or more corresponding discovery broadcast signals. The computer-readable medium further includes wherein the one or more corresponding discovery broadcast signals include information on timing of the second awake period for each respective relay device. The computer-readable medium further includes wherein the selecting the relay wireless communications device based on one or more parameters including an amount of energy consumption used to transmit to a third wireless communications device via the relay wireless communications device, a number of intermediate relays to the third wireless communications device, and whether awake periods of the relay wireless communications device overlap with awake periods of the first wireless communications device. The computer-readable medium further includes wherein information used to determine the parameters is included in the discovery broadcast signal received from the relay wireless communications device. The computer-readable medium further includes wherein the one or more discovery broadcast signals are received at a third periodic rate, and the first wireless communications device moves out of range of the relay wireless communications device at a fourth periodic rate. The computer-readable medium further includes wherein the third periodic rate is approximately equal to the fourth periodic rate. The computer-readable medium further includes code for causing the first wireless communications device to transmit uplink traffic data at a fifth periodic rate, the fifth periodic rate being greater than the third periodic rate. The computer-readable medium further includes wherein the fourth periodic rate is greater than the third periodic rate. The computer-readable medium further includes code for causing the first wireless communications device to transmit uplink traffic data at a fifth periodic rate, the third periodic rate being greater than the fifth periodic rate. The computer-readable medium further includes wherein the code for causing the first wireless communications device to associate further comprises code for causing the first wireless communications device to generate an association request signal and code for causing the first wireless communications device to send, to the relay wireless communications device, the association request signal including an expected upload traffic periodicity. The computer-readable medium further includes wherein the code for causing the first wireless communications device to associate further comprises code for causing the first wireless communications device to send, to the relay wireless communications device, an indication of the third periodic rate. The computer-readable medium further includes code for causing the first wireless communications device to determine the third periodic rate based on an amount of overhead used to send the link confirmation signal and an amount of mobility latency between the first wireless communications device and the relay wireless communications device. The computer-readable medium further includes code for causing the first wireless communications device to determine a link breakage to the relay wireless communications device in response to the transceiver failing to receive an expected stay alive signal from the relay wireless communications device. The computer-readable medium further includes code for causing the first wireless communications device to select a target relay wireless communications device from one or more second wireless communications devices. The program code further includes code for causing the first wireless communications device to associate with the target relay wireless communications device. The computer-readable medium further includes wherein the selection is based on one or more parameters including an amount of energy consumption used to transmit to a third wireless communications device via the target relay wireless communications device, a number of intermediate relays to the third wireless communications device, and whether awake periods of the target relay wireless communications device overlap with awake periods of the first wireless communications device. The program code further includes wherein the parameters are included in a list identifying the one or more second wireless communications devices. The computer-readable medium further includes code for causing the first wireless communications device to receive, from at least one of the one or more second wireless communications devices, one or more corresponding discovery broadcast signals, wherein the selection is based on one or more parameters including an amount of energy consumption used to transmit to a third wireless communications device via the target relay wireless communications device, a number of intermediate relays to the third wireless communications device, and whether awake periods of the target relay wireless communications device overlap with awake periods of the first wireless communications device. The program code further includes code for causing the first wireless communications device to determine the parameters from information included in the one or more discovery broadcast signals. The computer-readable medium further includes code for causing the first wireless communications device to establish, with the third wireless communications device, an uplink connection until the association with the target relay wireless communications device is complete. The computer-readable medium further includes wherein the link confirmation signal includes an estimation of a periodicity of uplink traffic. The computer-readable medium further includes wherein the second awake period and the third awake period are the same. The computer-readable medium further includes code for causing the first wireless communications device to receive, from a third wireless communications device, a downlink page signal. The program code further includes code for causing the first wireless communications device to send, to the third wireless communications device via the relay wireless communications device, a connection request signal for the third wireless communications device in response to the downlink page signal. The computer-readable medium further includes wherein the downlink page signal is received from the third wireless communications device. The computer-readable medium further includes wherein the downlink page signal is received from the third wireless communications device via the relay wireless communications device. The computer-readable medium further includes code for causing the first wireless communications device to receive, from the third wireless communications device, a connection setup signal. The program code further includes code for causing the first wireless communications device to send, to the third wireless communications device via the relay wireless communications device, a connection setup complete signal and a service request signal. The computer-readable medium further includes code for causing the first wireless communications device to receive the connection setup signal from the third wireless communications device via the relay wireless communications device. The computer-readable medium further includes code for causing the first wireless communications device to receive, from a third wireless communications device, a downlink page signal. The program code further includes code for causing the first wireless communications device to send, to a non-associated relay wireless communications device, a device to device connection request. The program code further includes code for causing the first wireless communications device to receive, from the non-associated relay wireless communications device, a device to device connection setup signal. The program code further includes code for causing the first wireless communications device to send, to the third wireless communications device via the non-associated relay wireless communications device, a connection request signal for the third wireless communications device. The computer-readable medium further includes code for causing the first wireless communications device to receive, from the third wireless communications device, a connection setup signal. The program further includes code for causing the first wireless communications device to send, to the third wireless communications device via the non-associated relay wireless communications device, a connection setup complete signal and a service request signal. The computer-readable medium further includes code for causing the first wireless communications device to receive the connection setup signal directly from the third wireless communications device. The computer-readable medium further includes code for causing the first wireless communications device to receive the connection setup signal from the third wireless communications device via the non-associated relay wireless communications device.

Embodiments of the present disclosure further include a computer-readable medium having program code recorded thereon, the program code comprising code for causing a first wireless communications device to send, to a second wireless communications device, a discovery broadcast signal during a first awake period that occurs at a first periodic rate. The program code further includes code for causing the first wireless communications device to receive, from the second wireless communications device, an association request signal during a second awake period. The program code further includes code for causing the first wireless communications device to send, to the second wireless communications device, a stay alive signal during a third awake period that occurs at a second periodic rate. The program code further includes code for causing the first wireless communications device to monitor for a link confirmation signal from the second wireless communications device during a fourth awake period that occurs at a third periodic rate.

The computer-readable medium further includes wherein the second periodic rate is higher than first periodic rate. The computer-readable medium further includes wherein the association request signal includes an upload traffic periodicity and information on the third periodic rate. The computer-readable medium further includes wherein the discovery broadcast signal includes information on the second periodic rate. The computer-readable medium further includes wherein the discovery broadcast signal includes information used for by the second wireless communications device to determine one or more parameters including: an amount of energy consumption necessary for the second wireless communications device to transmit to a third wireless communications device via the first wireless communications device, a number of intermediate relays to the third wireless communications device from the second wireless communications device, and whether awake periods of the first wireless communications device overlap with awake periods of the second wireless communications device. The computer-readable medium further includes code for causing the first wireless communications device to determine a link breakage to the second wireless communications device in response to failing to receive an expected link confirmation signal from the second wireless communications device. The computer-readable medium further includes code for causing the first wireless communications device to send, to a third wireless communications device, an associated device update signal. The computer-readable medium further includes code for causing the first wireless communications device to receive, from the second wireless communications device, a connection request for a third wireless communications device. The computer-readable medium further includes code for causing the first wireless communications device to relay, to the third wireless communications device, the connection setup complete signal and the service request. The computer-readable medium further includes code for causing the first wireless communications device to receive, from the third wireless communications device, a downlink page for the at least one second wireless communications device. The computer-readable medium further includes code for causing the first wireless communications device to relay, to the at least one second wireless communications device, the downlink page. The computer-readable medium further includes code for causing the first wireless communications device to receive, from the third wireless communications device, a connection setup signal for the second wireless communications device. The computer-readable medium further includes code for causing the first wireless communications device to relay, to the second wireless communications device, the connection setup signal. The computer-readable medium further includes code for causing the first wireless communications device to receive, from a non-associated second wireless communications device, a device to device connection request. The computer-readable medium further includes code for causing the first wireless communications device to send, to the non-associated second wireless communications device, a device to device connection setup signal. The computer-readable medium further includes code for causing the first wireless communications device to receive, from the non-associated second wireless communications device, a connection request for a third wireless communications device. code for causing the first wireless communications device to relay, to the third wireless communications device, the connection request. code for causing the first wireless communications device to receive, from the third wireless communications device, a connection setup signal for the non-associated second wireless communications device. The computer-readable medium further includes code for causing the first wireless communications device to relay, to the non-associated second wireless communications device, the connection setup signal. The computer-readable medium further includes code for causing the first wireless communications device to receive, from the non-associated second wireless communications device, a connection setup complete signal and a service request for the third wireless communications device. The computer-readable medium further includes code for causing the first wireless communications device to relay, to the third wireless communications device, the connection setup complete signal and the service request. The computer-readable medium further includes wherein the first awake period is the same as the second awake period.

Embodiments of the present disclosure further include a computer-readable medium having program code recorded thereon, the program code comprising code for causing a first wireless communications device to send, to a second wireless communications device, a downlink page for the second wireless communications device. The program code further includes code for causing the first wireless communications device to receive, from a relay wireless communications device, a relayed connection request from the second wireless communications device. The program code further includes code for causing the first wireless communications device to send, to the second wireless communications device, a connection setup signal in response to the relayed connection request. The program code further includes code for causing the first wireless communications device to receive, from the relay wireless communications device, a relayed connection complete signal and relayed service request.

The computer-readable medium further includes code for causing the first wireless communications device to send the downlink page to the second wireless communications device via the relay wireless communications device. The computer-readable medium further includes code for causing the first wireless communications device to send the connection setup signal to the second wireless communications device via the relay wireless communications device. The computer-readable medium further includes code for causing the first wireless communications device to send the downlink page to the second wireless communications device directly. The computer-readable medium further includes code for causing the first wireless communications device to send the connection setup signal to the second wireless communications device directly. The computer-readable medium further includes code for causing the first wireless communications device to receive, from the relay wireless communications device, an associated device update signal indicating that the second wireless communications device can be reached via the relay wireless communications device. The computer-readable medium further includes code for causing the first wireless communications device to determine, based on information contained in the relayed connection request, that the second wireless communications device can be reached via the relay wireless communications device. The computer-readable medium further includes code for causing the first wireless communications device to coordinate, with the second wireless communications device, an awake period for sending the downlink page.

Embodiments of the present disclosure further include an apparatus comprising means for associating with a relay wireless communications device during a first awake period. The apparatus further comprises means for monitoring for a stay alive signal from the relay wireless communications device during a second awake period that occurs at a first periodic rate regardless of whether there is traffic to receive. The apparatus further comprises means for sending a link confirmation signal to the relay wireless communications device during a third awake period that occurs at a second periodic rate regardless of whether there is traffic to transmit.

The apparatus further includes means for maintaining a list of one or more second wireless communications devices, the one or more second wireless communications devices identified from one or more discovery broadcast signals, and means for selecting the relay wireless communications device from the list of one or more second during the first awake period. The apparatus further includes means for populating the list of the one or more second wireless communications devices based on one or more corresponding discovery broadcast signals. The apparatus further includes wherein the one or more corresponding discovery broadcast signals include information on timing of the second awake period for each respective relay device. The apparatus further includes wherein the selecting the relay wireless communications device is based on one or more parameters including an amount of energy consumption used to transmit to a third wireless communications device via the relay wireless communications device, a number of intermediate relays to the third wireless communications device, and whether awake periods of the relay wireless communications device overlap with awake periods of the apparatus. The apparatus further includes wherein information used to determine the parameters is included in the discovery broadcast signal received from the relay wireless communications device. The apparatus further includes wherein the one or more discovery broadcast signals are received at a third periodic rate, and the apparatus moves out of range of the relay wireless communications device at a fourth periodic rate. The apparatus further includes wherein the third periodic rate is approximately equal to the fourth periodic rate. The apparatus further includes wherein the apparatus transmits uplink traffic data at a fifth periodic rate, the fifth periodic rate being greater than the third periodic rate. The apparatus further includes wherein the fourth periodic rate is greater than the third periodic rate. The apparatus further includes wherein the apparatus transmits uplink traffic data at a fifth periodic rate, the third periodic rate being greater than the fifth periodic rate. The apparatus further includes means for sending, to the relay wireless communications device, an association request signal including an expected upload traffic periodicity. The apparatus further includes means for sending, to the relay wireless communications device, an indication of the third periodic rate. The apparatus further includes wherein the apparatus determines the third periodic rate based on an amount of overhead used to send the link confirmation signal and an amount of mobility latency between the apparatus and the relay wireless communications device. The apparatus further includes means for determining a link breakage to the relay wireless communications device in response to failing to receive an expected stay alive signal from the relay wireless communications device. The apparatus further includes means for selecting a target relay wireless communications device from one or more second wireless communications devices, and means for associating with the target relay wireless communications device. The apparatus further includes wherein the selecting is based on one or more parameters including an amount of energy consumption used to transmit to a third wireless communications device via the target relay wireless communications device, a number of intermediate relays to the third wireless communications device, and whether awake periods of the target relay wireless communications device overlap with awake periods of the apparatus, and the parameters are included in a list identifying the one or more second wireless communications devices. The apparatus further includes wherein means for receiving, from at least one of the one or more second wireless communications devices, one or more corresponding discovery broadcast signals, wherein the selecting is based on one or more parameters including an amount of energy consumption used to transmit to a third wireless communications device via the target relay wireless communications device, a number of intermediate relays to the third wireless communications device, and whether awake periods of the target relay wireless communications device overlap with awake periods of the apparatus, and the parameters are determined by the apparatus from information included in the one or more discovery broadcast signals. The apparatus further includes means for establishing, with the third wireless communications device, an uplink connection until the association with the target relay wireless communications device is complete. The apparatus further includes wherein the link confirmation signal includes an estimation of a periodicity of uplink traffic. The apparatus further includes wherein the second awake period and the third awake period are the same. The apparatus further includes means for receiving, from a third wireless communications device, a downlink page signal, and means for sending, to the third wireless communications device via the relay wireless communications device, a connection request signal for the third wireless communications device in response to the downlink page signal. The apparatus further includes wherein the downlink page signal is received from the third wireless communications device. The apparatus further includes wherein the downlink page signal is received from the third wireless communications device via the relay wireless communications device. The apparatus further includes means for receiving, from the third wireless communications device, a connection setup signal, and means for sending, to the third wireless communications device via the relay wireless communications device, a connection setup complete signal and a service request signal. The apparatus further includes wherein the connection setup signal is received from the third wireless communications device via the relay wireless communications device. The apparatus further includes means for receiving, from a third wireless communications device, a downlink page signal, means for sending, to a non-associated relay wireless communications device, a device to device connection request, means for receiving, from the non-associated relay wireless communications device, a device to device connection setup signal, and means for sending, to the third wireless communications device via the non-associated relay wireless communications device, a connection request signal for the third wireless communications device. The apparatus further includes means for receiving, from the third wireless communications device, a connection setup signal, and means for sending, to the third wireless communications device via the non-associated relay wireless communications device, a connection setup complete signal and a service request signal. The apparatus further includes means for receiving the connection setup signal directly from the third wireless communications device. The apparatus further includes wherein the connection setup signal is received from the third wireless communications device via the non-associated relay wireless communications device.

Embodiments of the present disclosure further include an apparatus comprising means for sending, to a second wireless communications device, a discovery broadcast signal during a first awake period that occurs at a first periodic rate. The apparatus further comprises means for receiving, from the second wireless communications device, an association request signal during a second awake period. The apparatus further comprises means for sending, to the second wireless communications device, a stay alive signal during a third awake period that occurs at a second periodic rate. The apparatus further comprises means for sending, to the second wireless communications device, a stay alive signal during a third awake period that occurs at a second periodic rate. The apparatus further comprises means for monitoring for a link confirmation signal from the second wireless communications device during a fourth awake period that occurs at a third periodic rate.

The apparatus further includes wherein the second periodic rate is higher than first periodic rate. The apparatus further includes wherein the association request signal includes an upload traffic periodicity and information on the third periodic rate. The apparatus further includes wherein the discovery broadcast signal includes information on the second periodic rate. The apparatus further includes wherein the discovery broadcast signal includes information used for by the second wireless communications device to determine one or more parameters including an amount of energy consumption necessary for the second wireless communications device to transmit to a third wireless communications device via the apparatus, a number of intermediate relays to the third wireless communications device from the second wireless communications device, and whether awake periods of the apparatus overlap with awake periods of the second wireless communications device. The apparatus further includes means for determining a link breakage to the second wireless communications device in response to failing to receive an expected link confirmation signal from the second wireless communications device. The apparatus further includes means for sending, to a third wireless communications device, an associated device update signal. The apparatus further includes means for receiving, from the second wireless communications device, a connection request for a third wireless communications device, means for relaying, to the third wireless communications device, the connection request, means for receiving, from the second wireless communications device, a connection setup complete signal and a service request for the third wireless communications device, and means for relaying, to the third wireless communications device, the connection setup complete signal and the service request. The apparatus further includes means for receiving, from the third wireless communications device, a downlink page for the at least one second wireless communications device, and means for relaying, to the at least one second wireless communications device, the downlink page. The apparatus further includes means for receiving, from the third wireless communications device, a connection setup signal for the second wireless communications device, and means for relaying, to the second wireless communications device, the connection setup signal. The apparatus further includes means for receiving, from a non-associated second wireless communications device, a device to device connection request, means for sending, to the non-associated second wireless communications device, a device to device connection setup signal, means for receiving, from the non-associated second wireless communications device, a connection request for a third wireless communications device, and means for relaying, to the third wireless communications device, the connection request. The apparatus further includes means for receiving, from the third wireless communications device, a connection setup signal for the non-associated second wireless communications device, and means for relaying, to the non-associated second wireless communications device, the connection setup signal. The apparatus further includes means for receiving, from the non-associated second wireless communications device, a connection setup complete signal and a service request for the third wireless communications device, and means for relaying, to the third wireless communications device, the connection setup complete signal and the service request. The apparatus further includes wherein the first awake period is the same as the second awake period.

Embodiments of the present disclosure further include an apparatus comprising means for sending, to a second wireless communications device, a downlink page pending for the second wireless communications device. The apparatus further comprises means for receiving, from a relay wireless communications device, a relayed connection request from the second wireless communications device. The apparatus further comprises means for sending, to the second wireless communications device, a connection setup signal in response to the relayed connection request. The apparatus further comprises means for receiving, from the relay wireless communications device, a relayed connection complete signal and relayed service request.

The apparatus further comprises means for sending the downlink page to the second wireless communications device via the relay wireless communications device. The apparatus further comprises means for sending the connection setup signal to the second wireless communications device via the relay wireless communications device. The apparatus further comprises means for sending the downlink page to the second wireless communications device directly. The apparatus further comprises means for sending the connection setup signal to the second wireless communications device directly. The apparatus further comprises means for receiving, from the relay wireless communications device, an associated device update signal indicating that the second wireless communications device can be reached via the relay wireless communications device. The apparatus further comprises means for determining based on information contained in the relayed connection request, that the second wireless communications device can be reached via the relay wireless communications device. The apparatus further comprises means for coordinating, with the second wireless communications device, an awake period for sending the downlink page.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method comprising:
    associating, by a first wireless communications device, with a relay wireless communications device during a first awake period common to the first wireless communications device and the relay wireless communications device;
    monitoring, by the first wireless communications device during a second awake period, for a stay alive signal from the relay wireless communications device transmitted at a first periodic rate regardless of whether there is traffic to receive; and
    sending, by the first wireless communications device during a third awake period, a link confirmation signal to the relay wireless communications device at a second periodic rate regardless of whether there is traffic to transmit,
    wherein the first periodic rate and the second periodic rate are different, and
    wherein the first wireless communications device is asleep at a time that overlaps a sleep time of the relay wireless communications device.

2. The method of claim 1, further comprising:
    maintaining, by the first wireless communications device, a list of one or more second wireless communications devices, the one or more second wireless communications devices identified from one or more discovery broadcast signals; and
    selecting, by the first wireless communications device, the relay wireless communications device from the list of one or more second wireless communication devices during the first awake period.

3. The method of claim 2, wherein the selecting the relay wireless communications device is based on one or more parameters including:
    an amount of energy consumption used to transmit to a third wireless communications device via the relay wireless communications device,
    a number of intermediate relays to the third wireless communications device, or
    whether awake periods of the relay wireless communications device overlap with awake periods of the first wireless communications device.

4. The method of claim 2, further comprising:
    receiving the one or more discovery broadcast signals at a third periodic rate; and
    moving, by the first wireless communications device, out of range of the relay wireless communications device at a fourth periodic rate.

5. The method of claim 1, wherein associating further comprises:
    sending, from the first wireless communications device to the relay wireless communications device, an association request signal including an expected upload traffic periodicity.

6. The method of claim 1, further comprising:
    determining, at the first wireless communications device, a link breakage to the relay wireless communications device in response to failing to receive an expected stay alive signal from the relay wireless communications device;
    selecting, by the first wireless communications device, a target relay wireless communications device from one or more second wireless communications devices; and
    associating, by the first wireless communications device, with the target relay wireless communications device.

7. The method of claim 6, further comprising:
    communicating, by the first wireless communications device, with a third wireless communications device via the target relay wireless communications device;
    receiving, at the first wireless communications device from at least one of the one or more second wireless communications devices, one or more corresponding discovery broadcast signals; and
    sending, by the first wireless communications device to the third wireless communications device, an uplink signal during the association with the target relay wireless communications device,
    wherein the sending the uplink signal is independent from the target wireless communications device, and
    wherein the selecting is based on one or more parameters including an amount of energy consumption used to transmit to the third wireless communications device via the target relay wireless communications device, a number of intermediate relays to the third wireless communications device, and whether awake periods of the target relay wireless communications device overlap with awake periods of the first wireless communications device, and
    the parameters are determined by the first wireless communications device from information included in the one or more discovery broadcast signals.

8. The method of claim 1, further comprising:
    receiving, at the first wireless communications device from a third wireless communications device via the relay wireless communications device, a downlink page signal; and
    sending, from the first wireless communications device to the third wireless communications device via the relay wireless communications device, a connection request signal for the third wireless communications device in response to the downlink page signal.

9. The method of claim 1, further comprising:
receiving, at the first wireless communications device from a third wireless communications device, a downlink page signal;
sending, from the first wireless communications device to a non-associated relay wireless communications device, a device to device connection request;
receiving, at the first wireless communications device from the non-associated relay wireless communications device, a device to device connection setup signal; and
sending, from the first wireless communications device to the third wireless communications device via the non-associated relay wireless communications device, a connection request signal for the third wireless communications device.

10. A method comprising:
sending, from a first wireless communications device to a second wireless communications device, a discovery broadcast signal during a first awake period that occurs at a first periodic rate;
receiving, from the second wireless communications device, an association request signal during a second awake period;
sending, from the first wireless communications device to the second wireless communications device during a third awake period, a stay alive signal at a second periodic rate; and
monitoring, by the first wireless communications device during a fourth awake period, for a link confirmation signal from the second wireless communications device transmitted at a third periodic rate that is different from the second periodic rate.

11. The method of claim 10, wherein the discovery broadcast signal includes information used for by the second wireless communications device to determine one or more parameters including:
an amount of energy consumption necessary for the second wireless communications device to transmit to a third wireless communications device via the first wireless communications device,
a number of intermediate relays to the third wireless communications device from the second wireless communications device, and
whether awake periods of the first wireless communications device overlap with awake periods of the second wireless communications device.

12. The method of claim 10, further comprising:
determining, at the first wireless communications device, a link breakage to the second wireless communications device in response to failing to receive an expected link confirmation signal from the second wireless communications device.

13. The method of claim 10, further comprising:
receiving, at the first wireless communications device from the second wireless communications device, a connection request for a third wireless communications device;
relaying, from the first wireless communications device to the third wireless communications device, the connection request;
receiving, at the first wireless communications device from the second wireless communications device, a connection setup complete signal and a service request for the third wireless communications device; and
relaying, from the first wireless communications device to the third wireless communications device, the connection setup complete signal and the service request.

14. The method of claim 13, further comprising:
receiving, at the first wireless communications device from the third wireless communications device, a downlink page for the second wireless communications device; and
relaying, from the first wireless communications device to the second wireless communications device, the downlink page.

15. The method of claim 10, further comprising:
receiving, at the first wireless communications device from a non-associated second wireless communications device, a device to device connection request;
sending, from the first wireless communications device to the non-associated second wireless communications device, a device to device connection setup signal;
receiving, at the first wireless communications device from the non-associated second wireless communications device, a connection request for a third wireless communications device; and
relaying, from the first wireless communications device to the third wireless communications device, the connection request.

16. The method of claim 15, further comprising:
receiving, at the first wireless communications device from the third wireless communications device, a connection setup signal for the non-associated second wireless communications device; and
relaying, from the first wireless communications device to the non-associated second wireless communications device, the connection setup signal.

17. The method of claim 15, further comprising:
receiving, at the first wireless communications device from the non-associated second wireless communications device, a connection setup complete signal and a service request for the third wireless communications device; and
relaying, from the first wireless communications device to the third wireless communications device, the connection setup complete signal and the service request.

18. The method of claim 10, wherein the first awake period is the same as the second awake period.

19. An apparatus, comprising:
a processor configured to generate a link confirmation signal; and
a transceiver configured to:
establish association with a relay wireless communications device during a first awake period common to the apparatus and the relay wireless communications device;
monitor, during a second awake period, for a stay alive signal from the relay wireless communications device transmitted at a first periodic rate regardless of whether there is traffic to receive; and
send, during a third awake period, the link confirmation signal to the relay wireless communications device at a second periodic rate regardless of whether there is traffic to transmit, wherein the first periodic rate and the second periodic rate are different.

20. The apparatus of claim 19, wherein:
the transceiver is further configured to receive one or more discovery broadcast signals from one or more second wireless communications devices; and
the processor is further configured to:
maintain a list of the one or more second wireless communications devices, the one or more second wireless communications devices identified from the one or more discovery broadcast signals; and select the relay wireless communications device from the list of the one or more second wireless communications devices during the first awake period.

21. The apparatus of claim 20, wherein the processor is further configured to:
populate the list of the one or more second wireless communications devices based on one or more corresponding discovery broadcast signals.

22. The apparatus of claim 19, wherein:
the processor is further configured to generate an association request signal; and
the transceiver is further configured to send, to the relay wireless communications device, the association request signal including an expected upload traffic periodicity.

23. The apparatus of claim 19, wherein the processor is further configured to:
determine a link breakage to the relay wireless communications device in response to the transceiver failing to receive an expected stay alive signal from the relay wireless communications device.

24. The apparatus of claim 23, wherein the processor is further configured to:
select a target relay wireless communications device from one or more second wireless communications devices; and
initiate association with the target relay wireless communications device.

25. An apparatus comprising:
a processor configured to generate a discovery broadcast signal; and
a transceiver configured to:
send, to a second wireless communications device, the discovery broadcast signal during a first awake period that occurs at a first periodic rate;
receive, from the second wireless communications device, an association request signal during a second awake period;
send, to the second wireless communications device during a third awake period, a stay alive signal at a second periodic rate; and
monitor, during a fourth awake period, for a link confirmation signal from the second wireless communications device transmitted at a third periodic rate that is different from the second periodic rate.

26. The apparatus of claim 25, wherein the discovery broadcast signal includes information used for by the second wireless communications device to determine one or more parameters including:
an amount of energy consumption necessary for the second wireless communications device to transmit to a third wireless communications device via the apparatus,
a number of intermediate relays to the third wireless communications device from the second wireless communications device, and
whether awake periods of the apparatus overlap with awake periods of the second wireless communications device.

27. The apparatus of claim 25, wherein the processor is further configured to:
determine a link breakage to the second wireless communications device in response to failing to receive an expected link confirmation signal from the second wireless communications device.

28. The apparatus of claim 25, wherein the transceiver is further configured to:
send, to a third wireless communications device, an associated device update signal.

29. The apparatus of claim 25, wherein the transceiver is further configured to:
receive, from the second wireless communications device, a connection request for a third wireless communications device;
relay, to the third wireless communications device, the connection request;
receive, from the second wireless communications device, a connection setup complete signal and a service request for the third wireless communications device; and
relay, to the third wireless communications device, the connection setup complete signal and the service request.

30. The apparatus of claim 25, wherein the transceiver is further configured to:
receive, from a non-associated second wireless communications device, a device to device connection request;
send, to the non-associated second wireless communications device, a device to device connection setup signal;
receive, from the non-associated second wireless communications device, a connection request for a third wireless communications device; and
relay, to the third wireless communications device, the connection request.

* * * * *